United States Patent
Armstrong et al.

(10) Patent No.: US 7,512,655 B2
(45) Date of Patent: Mar. 31, 2009

(54) SYSTEM AND METHOD FOR MANAGING INFORMATION AND COLLABORATING

(75) Inventors: Brawnski Armstrong, Chicago, IL (US); Enrico Ferrari, Chicago, IL (US); Eric J. Kristoff, Chicago, IL (US); Graham Lawlor, Chicago, IL (US); Pat O'Donnell, Oak Lawn, IL (US); Adam Radulovic, Chicago, IL (US); Dave Schonberg, Wilmette, IL (US); Robert Seymour, Chicago, IL (US); Eric Sinclair, Chicago, IL (US); David Zaret, Chicago, IL (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/881,411

(22) Filed: Jun. 14, 2001

(65) Prior Publication Data
US 2004/0039779 A1 Feb. 26, 2004

Related U.S. Application Data

(63) Continuation of application No. 09/411,599, filed on Sep. 28, 1999, now abandoned.

(51) Int. Cl.
*G06F 15/16* (2006.01)
(52) U.S. Cl. .................. 709/205; 715/751; 715/758; 709/206
(58) Field of Classification Search ......... 709/204–206; 715/751
See application file for complete search history.

(56) References Cited

U.S. PATENT DOCUMENTS

| | | | |
|---|---|---|---|
| 5,544,303 A | 8/1996 | Maroteaux et al. | |
| 5,764,916 A * | 6/1998 | Busey et al. | 709/227 |
| 5,793,365 A | 8/1998 | Levenson et al. | |
| 5,870,536 A | 2/1999 | Kurosawa | 358/1.18 |
| 5,870,563 A | 2/1999 | Roper et al. | 709/239 |
| 5,870,744 A | 2/1999 | Sprague | |
| 5,880,731 A | 3/1999 | Liles et al. | |
| 5,931,908 A | 8/1999 | Gerba et al. | |
| 5,940,082 A | 8/1999 | Brinegar et al. | 345/442 |
| 5,956,491 A | 9/1999 | Marks | |
| 5,964,660 A | 10/1999 | James et al. | |

(Continued)

FOREIGN PATENT DOCUMENTS
WO PCT/US00/26780 12/2000

OTHER PUBLICATIONS

Two printouts of ichat website dated Jan. 5, 2001 (2 pp & 3 pp.).

(Continued)

*Primary Examiner*—Salad Abdullahi
(74) *Attorney, Agent, or Firm*—Merchant & Gould

(57) ABSTRACT

Disclosed is an information management and collaboration system and method for managing information flow in real time. A real time chat communication channel provides a link for users to interact in a customized setting. Users are provided with such customizable features as contextual transcripts, parameterized input and output panels, channel management, contact management and application interaction. The system and method disclosed allows information to be managed in a customized environment based on user preferences. Further, the system and method disclosed provide a highly configurable environment for interaction with other information and collaboration systems, as well as other utility application programs.

61 Claims, 33 Drawing Sheets

U.S. PATENT DOCUMENTS

| | | | |
|---|---|---|---|
| 5,964,836 A | | 10/1999 | Rowe et al. |
| 5,974,446 A | * | 10/1999 | Sonnenreich et al. ........ 709/204 |
| 5,987,503 A | * | 11/1999 | Murakami ................... 709/204 |
| 5,990,887 A | * | 11/1999 | Redpath et al. ............. 715/758 |
| 5,991,796 A | * | 11/1999 | Anupam et al. ............. 709/206 |
| 6,014,136 A | | 1/2000 | Ogasawara et al. |
| 6,021,433 A | | 2/2000 | Payne et al. |
| 6,092,102 A | * | 7/2000 | Wagner ..................... 340/7.29 |
| 6,106,399 A | | 8/2000 | Baker et al. |
| 6,144,991 A | * | 11/2000 | England ..................... 709/205 |
| 6,317,485 B1 | | 11/2001 | Homan et al. ............ 379/88.12 |
| 6,404,746 B1 | * | 6/2002 | Cave et al. .................. 370/262 |
| 6,421,706 B1 | * | 7/2002 | McNeill et al. ............. 709/204 |
| 6,425,012 B1 | * | 7/2002 | Trovato et al. .............. 709/227 |
| 6,499,053 B1 | * | 12/2002 | Marquette et al. ........... 709/204 |
| 6,640,241 B1 | * | 10/2003 | Ozzie et al. ................. 709/204 |
| 6,668,169 B2 | * | 12/2003 | Burgan et al. ............ 455/435.1 |
| 6,735,614 B1 | * | 5/2004 | Payne et al. ................. 709/203 |
| 6,742,032 B1 | * | 5/2004 | Castellani et al. ........... 709/224 |
| 6,742,116 B1 | * | 5/2004 | Matsui et al. ............... 713/171 |
| 6,745,178 B1 | * | 6/2004 | Emens et al. .................. 707/3 |
| 6,785,708 B1 | * | 8/2004 | Busey et al. ................ 709/204 |
| 6,988,126 B2 | | 1/2006 | Wilcock et al. |
| 7,263,526 B1 | | 8/2007 | Busey et al. ................ 707/102 |
| 2002/0019825 A1 | * | 2/2002 | Smiga et al. ................ 707/102 |
| 2005/0027802 A1 | | 2/2005 | Madsen et al. ............. 709/204 |
| 2007/0016647 A1 | | 1/2007 | Gupta et al. |

OTHER PUBLICATIONS

Two printouts of Tribal website dated Jan. 5, 2001 (1 pg & 1 pg).

Four printouts of Lotus website dated Jan. 5, 2001 (2 pp, 1 pg, 3 pp, 1 pg).

Two printouts of Novell website dated Jan. 5, 2001 (3 pp & 6 pp).

Seven printouts of digitalme website dated Apr. 17, 2001 (3 pp, 2 pp, 1 pg, 1 pg, 2 pp, 6 pp, 5 pp).

One printout of zdnet.co.uk website dated Apr. 17, 2001 (2 pp).

U.S. Appl. No. 09/411,599, filed Sep. 28, 1999 entitled "Computerized System for Embedding an Application User Interface Within Real-time Chat".

U.S. Appl. No. 09/675,017, filed Sep. 28, 2000 entitled "System and Method for Managing Information and Collaborating".

U.S. Office Action dated Dec. 14, 2000 cited in U.S. Appl. No. 09/411,599.

U.S. Office Action dated Apr. 9, 2007 cited in U.S. Appl. No. 10/929,623.

U.S. Office Action dated Dec. 13, 2007 cited in U.S. Appl. No. 10/929,623.

XP-002316721—J. Oikarinen et al., "Request for Comments RFC 1459, Internet Relay Chat Protocol," May 1993, pp. 1-65.

XP-002316722—C. Kalt, "Internet Draft Internet Relay Chat: Channel Management," Jun. 1999, pp. 1-18.

PX-002316723—C. Kalt, "Internet Draft: Internet Relay Chat: Server Protocol," Jul. 1999, pp. 1-27.

XP-002316724—C. Kalt, "Internet Relay Chat: Client Protocol," Aug. 1999, pp. 1-66.

U.S. Final Office Action dated Oct. 20, 2008 cited in U.S. Appl. No. 10/929,623.

* cited by examiner

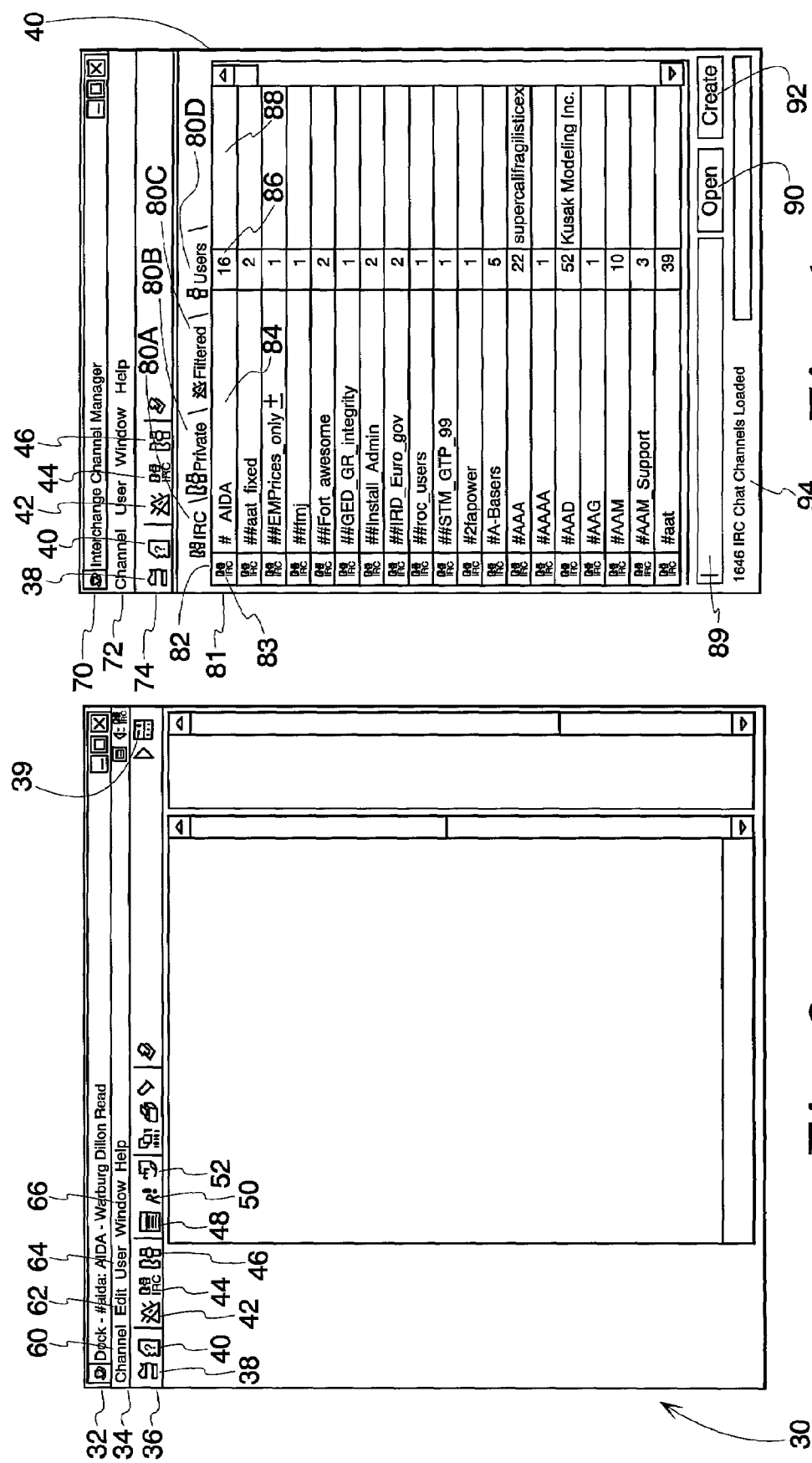

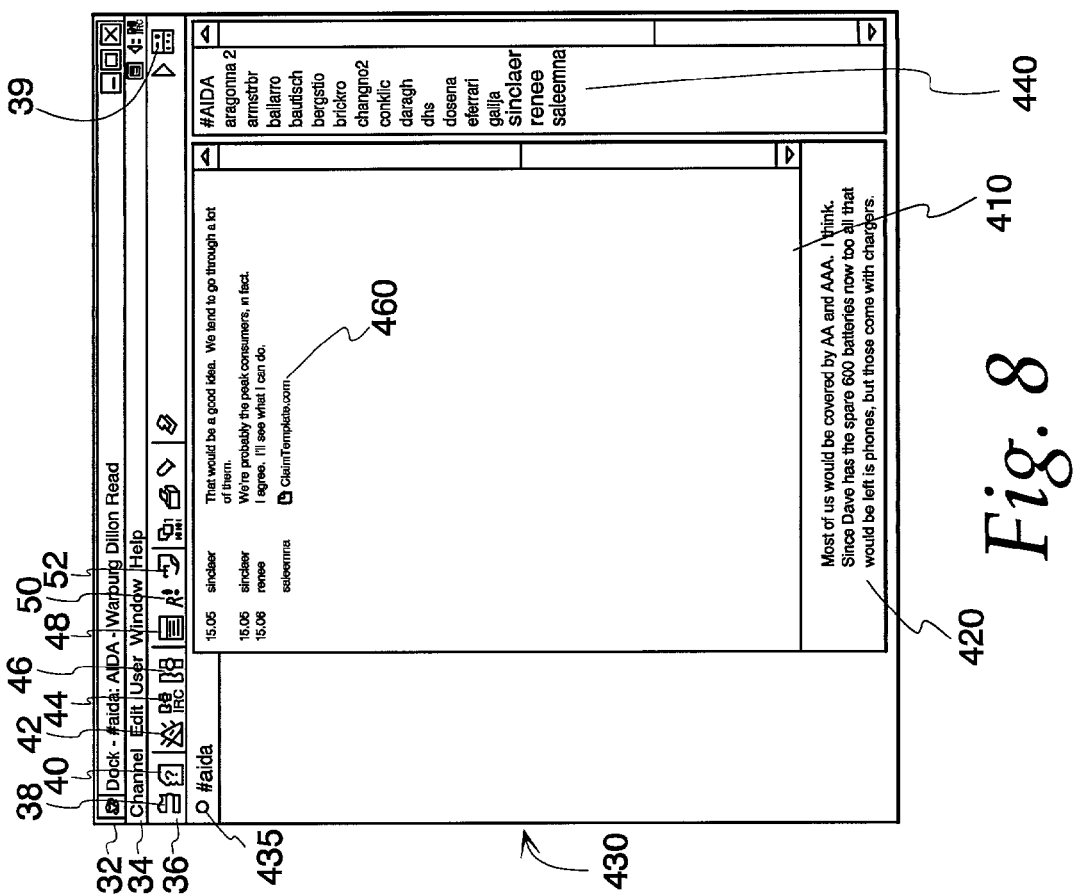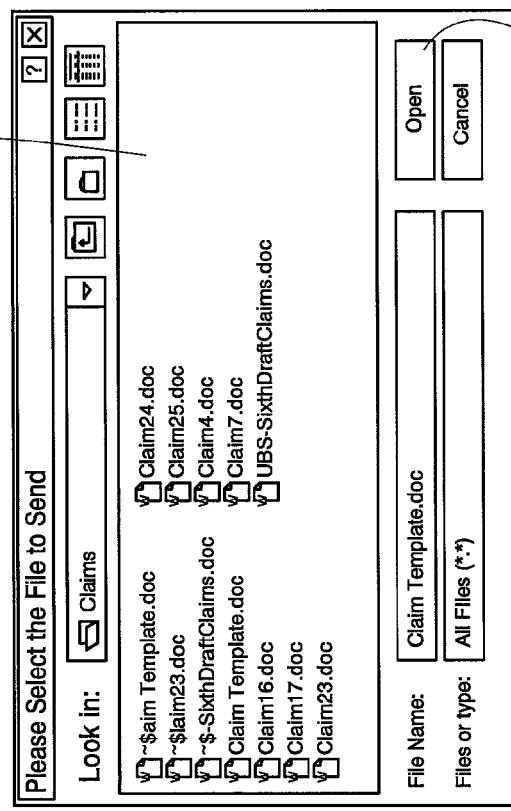
Fig. 7
Fig. 8

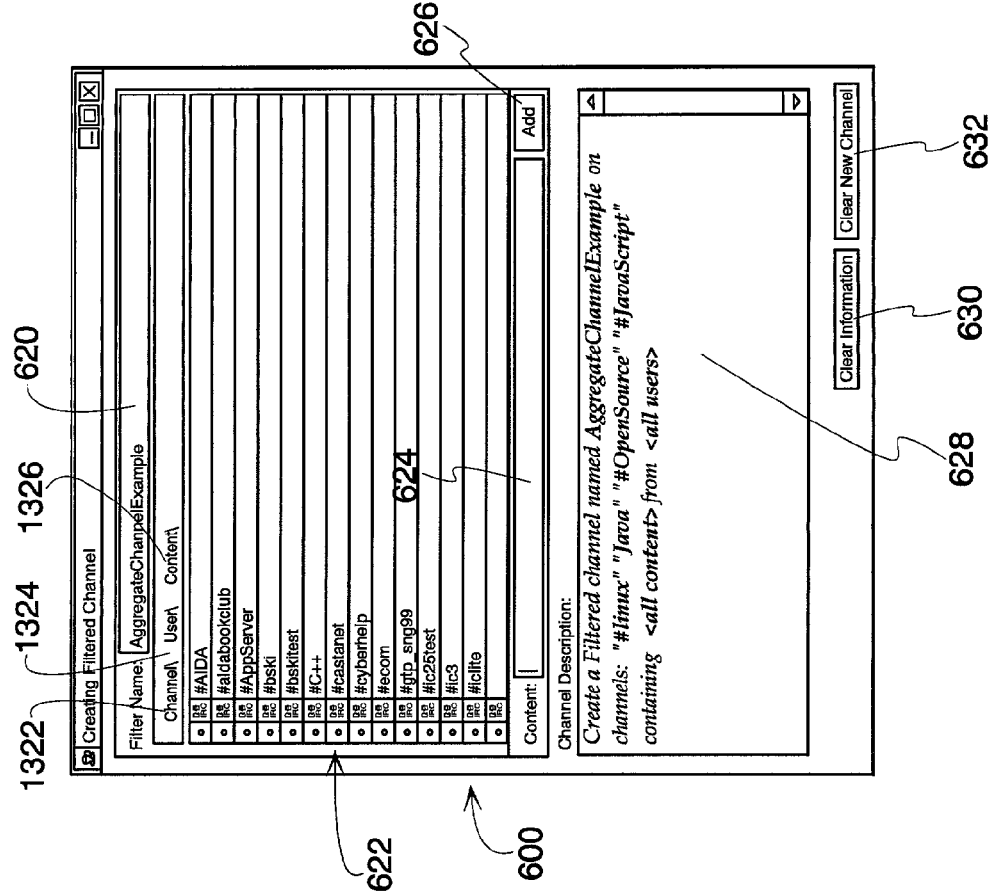
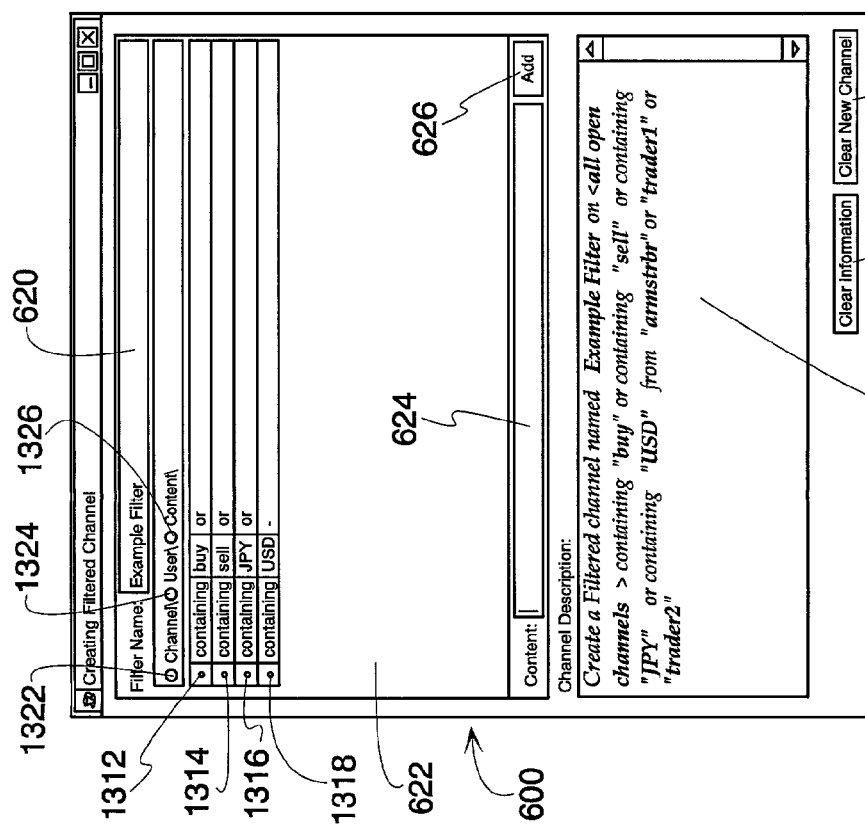
Fig. 12b
Fig. 12a

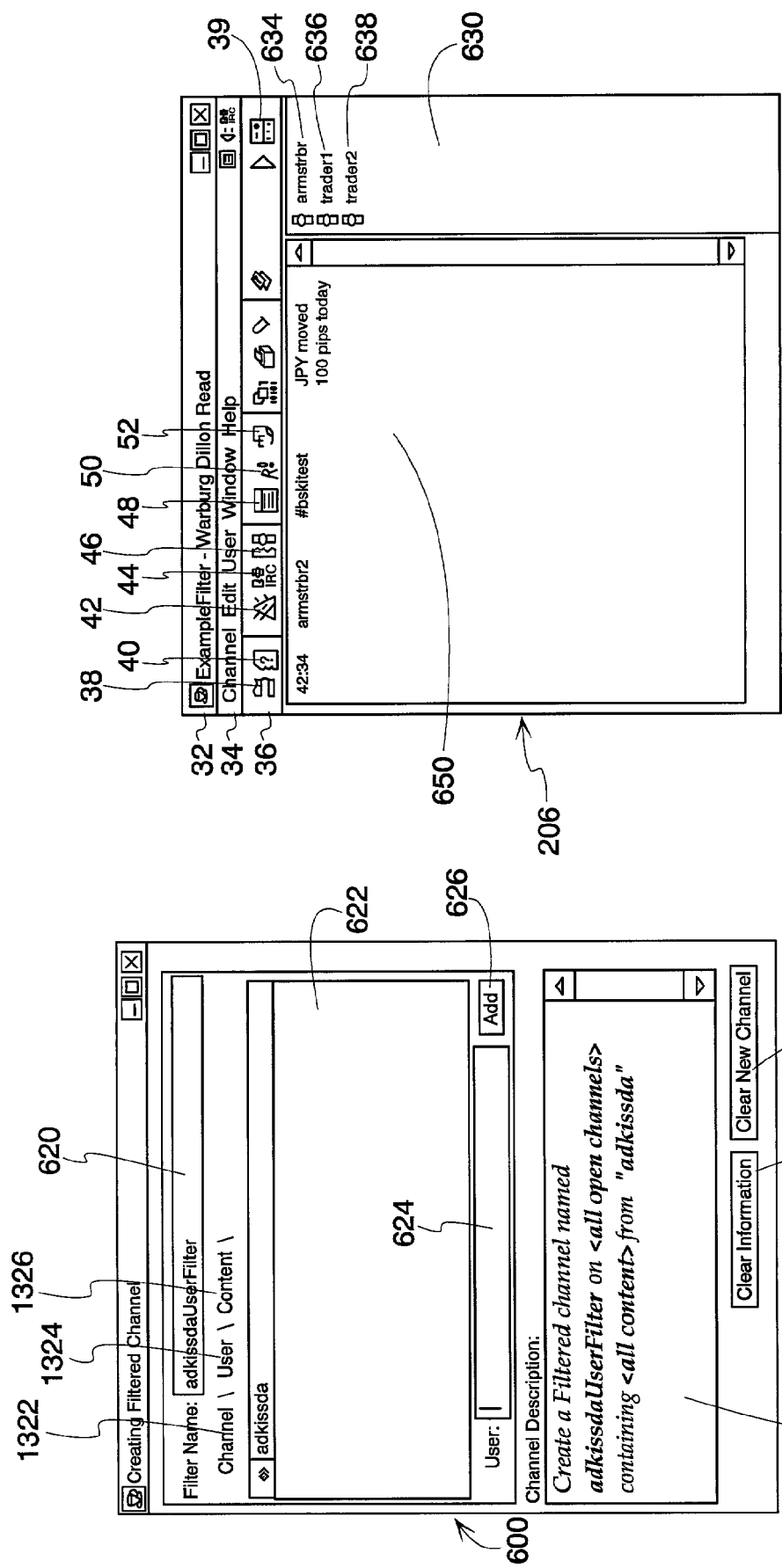

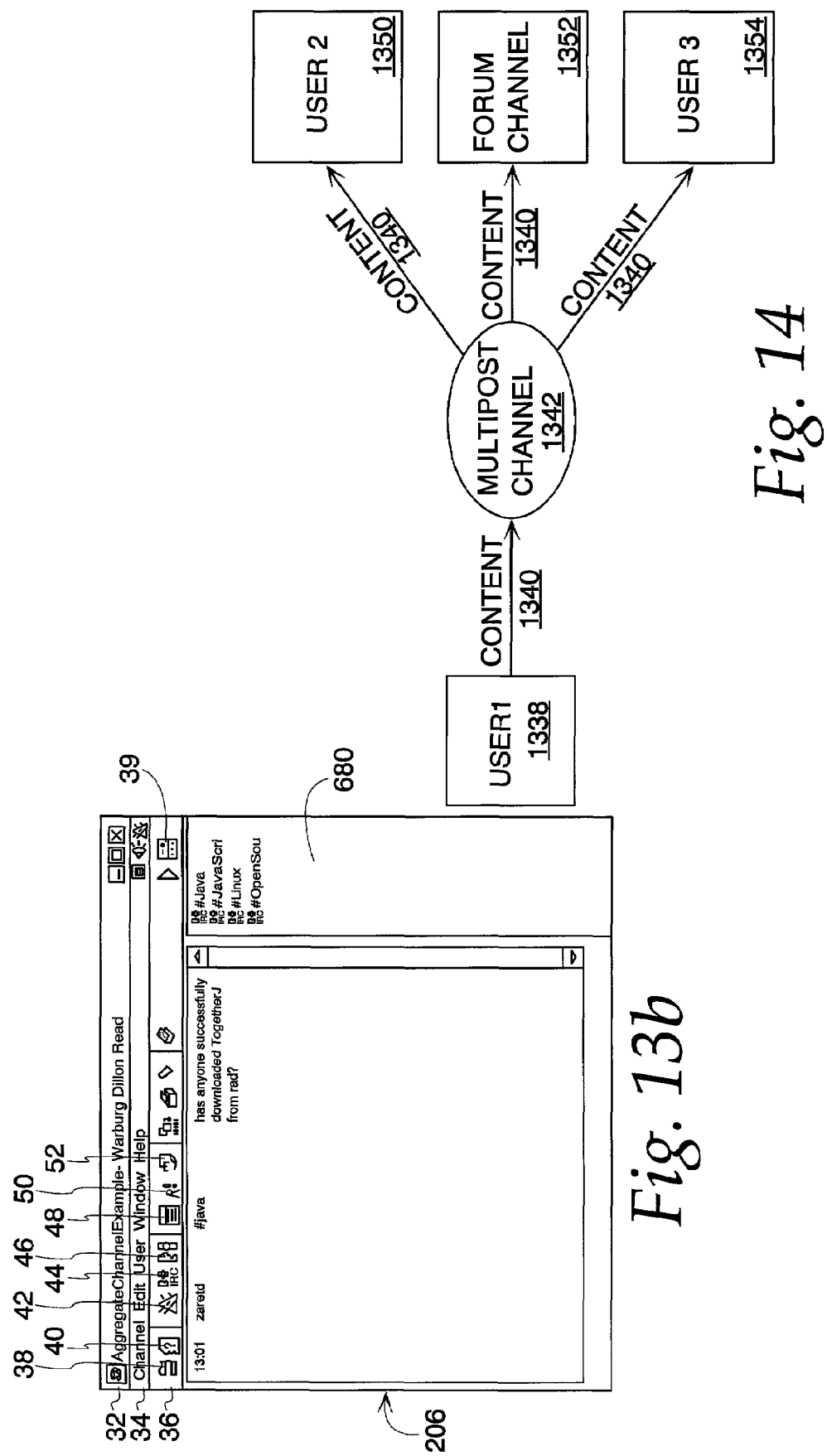

| Conference Meeting for Accounting - Appointment |

File  Edit  View  Insert  Format  Tools  Actions  Help

Save and Close   Recurrence...

| Appointment | Attendee Availability | Online |

Subject: Conference Meeting for Accounting
Location: Kerpana Conference Room    ☐ This is an online meeting
Start time: Wed 9/22/99   12:00PM   ☐ All day event
End time: Wed 9/22/99   1:00PM
☑ Reminder: 15 minutes    Show time as: Busy
☑ Chat Availability: Occupied    I'm currently unavailable for conferencing. I will return at 1

222    224    226

Categories...    Private ☐

*Fig. 20a*

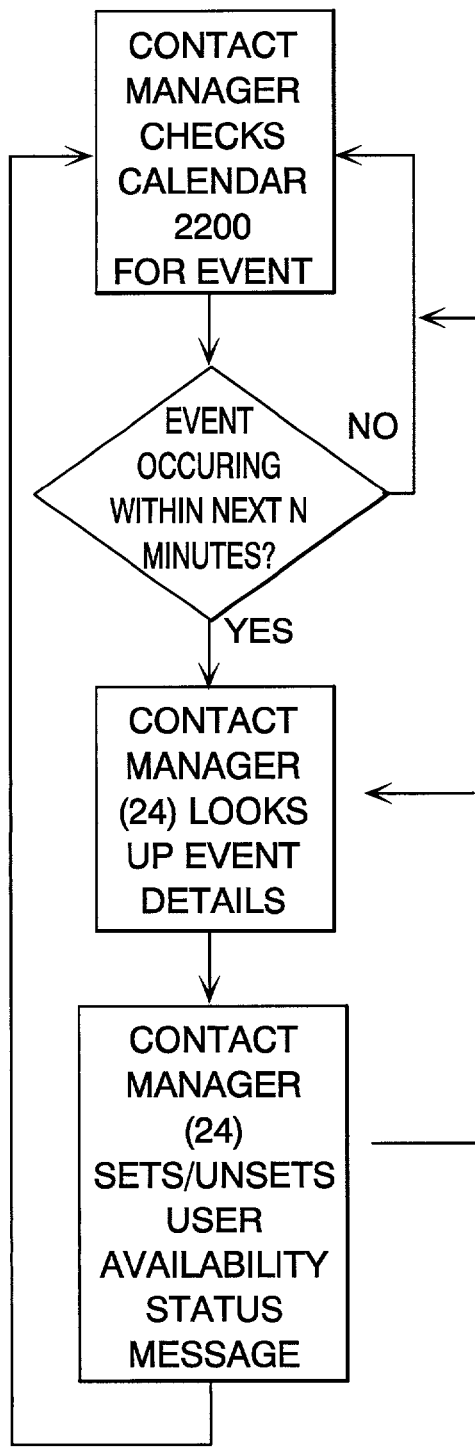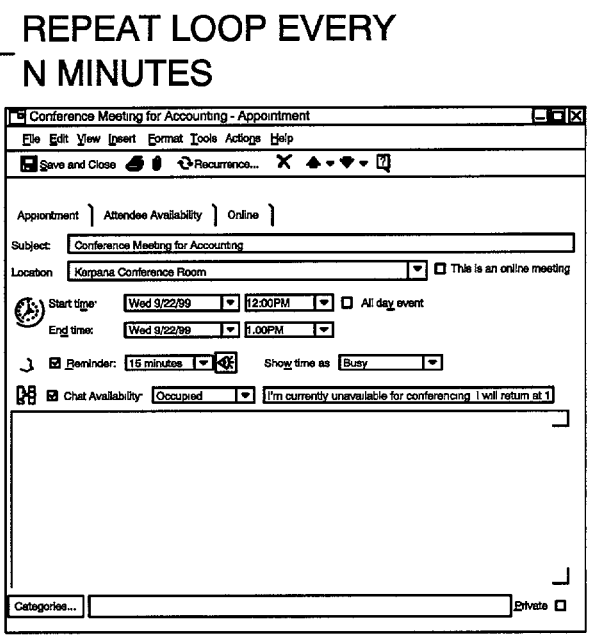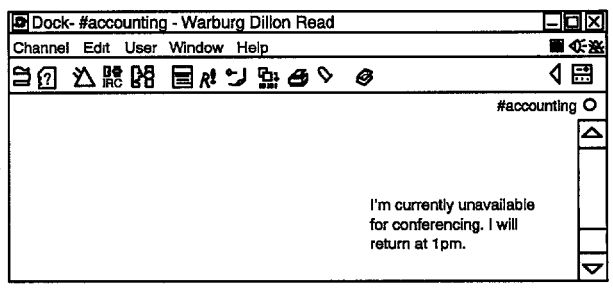
Fig. 20b

| Users | |
|---|---|
| Select a user from the User Database to decide which of your channels they are allowed on | ADAM<br>AJS<br>AK<br>ALEE —2122<br>ANuwer<br>AZ |
| | Select user |
| Enter a valid username to add to Channel #directory_engineering | ☐<br>⎯⎯⎯⎯⎯⎯⎯⎯ —2124<br>Apply Changes |
| Add a user to the <u>user database</u> | ⎯⎯⎯⎯⎯⎯⎯⎯<br>Add Nickname |
| Permissions | |

} 2120

Your Current Userlist contains 6 users.

☐ Show All Users or search for users matching ⎯⎯⎯⎯

Show

*Fig. 29*

Manager: <u>sinclaer</u>
<u>Change Password</u>  <u>Edit Information</u>  <u>Retire as Manager</u>

Channel: #directory_engineering
<u>Add/Remove Managers</u>  <u>Advanced Interface</u>

| Channel Editing Options | |
|---|---|
| Log this channel with BackChat? | ⦿ yes ○ no — 2102 |
| Should the botkick people who are not in the Userlist? | ⦿ yes ○ no — 2104 |
| Make this channel joinable by invitation only<br>The channel botwill auto-invite people in the Userlist | ○ yes ⦿ no — 2106 |
| Default Topic for this channel | ⎯⎯⎯⎯⎯⎯ |
| Allow only chanops to change the topic? | ⦿ yes ○ no |
| Should the bot override any topic changes? | ○ yes ⦿ no |
| Is this a secret channel? | ○ yes ⦿ no |
| Is this a client facing channel? | ○ yes ⦿ no |
| Dont forget to Apply your changes! | Apply Changes |

*Fig. 30*

| Back Chat |
|---|
| Sep 16 10:09 vanhovx it freezes on the dock/undock thing |
| Sep 16 10:10 webtesa final question - do you ever "kill" the tuner |
| Sep 16 10:10 webtesa by that I mean do a right click on the tuner icon, and choose exit |
| Sep 16 10:10 vanhovx when it freezes... i kill the virtula machine... |
| Sep 16 10:10 webtesa (do you use dock all/undock all?) |
| Sep 16 10:10 vanhovx not all nope...just ctrl d |
| Sep 16 10:10 webtesa what, via task manager? |
| Sep 16 10:10 vanhovx yes |
| Sep 16 10:10 webtesa ahhh - that's a new one using ctrl D |
| Sep 16 10:11 webtesa right - first off I may post that in the bug file |
| Sep 16 10:11 webtesa secondly, if you ever want to stop IC/tuner, please please please don't do it via the task manager |
| Sep 16 10:11 webtesa best way is to have the Tuner window open - do a right click on the blue icon and choose open |
| Sep 16 10:12 webtesa then stop IC by doing a right click on the Interchange entry and choosing stop |

SYSTEM AND METHOD FOR MANAGING INFORMATION AND COLLABORATING

CROSS-REFERENCE TO RELATED APPLICATIONS

This application is a continuation of U.S. application Ser. No. 09/411,599, filed Sep. 28, 1999, now abandoned entitled "Computerized System for Embedding an Application User Interface Within Real-time Chat," which is hereby incorporated by reference.

COPYRIGHT NOTICE

A portion of the disclosure of this patent document contains material that is subject to copyright protection. The copyright owner has no objection to a statutory fair use of this material, as it appears in the files or records of the U.S. Patent and Trademark Office, but otherwise reserves all copyright rights whatsoever.

FIELD OF INVENTION

This invention is directed to systems and methods that have real time chat capabilities. In particular, it is directed to information and collaboration management systems and methods that employ real-time chat.

BACKGROUND

As organizations become more and more global and the need for timely, pertinent information and collaboration becomes more critical, organizations need systems that allow its members to exchange massive amounts of information worldwide, internally and externally, in a real-time environment and in an effective manner so that members of the organization can use the timely information to keep up-to-date on pertinent developments and use this information to collaborate effectively with others in the organization. Information that is not managed effectively has diminished value and may actually hinder productivity as members of an organization become overwhelmed with information—useful and useless alike. An effective information management and collaboration system needs to be persistent, intuitive, scalable (e.g., as applicable to two people as it is to twenty thousand people), individually customizable and flexible to use.

Applications have developed over the years that have tried to address these needs. Although successful in some respects, none of these systems have developed to the point where they can manage all of the information within an organization, whether generated by humans or otherwise, in an integrated manner and then deliver this managed information in a focused, effective manner to the people who need such information. Furthermore, none of these systems allow a user to pick and choose their information sources and how they are displayed to them; rather, in these systems, these types of parameters are pre-set by the network administrator. Accordingly, there is a need for an effective information management and collaboration system that is persistent, intuitive, scalable, individually customizable and flexible to use.

SUMMARY

The present invention is directed to a system and method for effectively managing information and collaboration over a network and for providing users of the system and method tools to customize the information flow and presentation to their individual needs. According to one aspect of the present invention, a system for managing information on a network of the present invention includes an end user computing system having a user interface program loaded thereon which is operative to allow the end user to customize the information retrieved for display and a system management computing system having a system management program loaded thereon. According to this aspect of the invention, the user interface program and the system management program, when executed, interact with one another to establish a real time chat communication channel between one another to manage the information flow across the network. In another aspect of the invention, the end user computing system may have an application program stored on it that is integrated with the user interface program such that the user interface program, when executed, interacts with the application program to provide data to the user interface program. This application program may be a program such as a calendar program. In one aspect of the invention, the user interface program may generate a user interface through which the end user may customize the information he or she receives by selecting and generating channels through the user interface. Generated channels according to one aspect of the invention may include contextual chat messages. The end user in one aspect of the invention may create structured messages for transmission over the network.

According to another aspect of the invention, the end user may generate filtered channels through the user interface. The generated filter channels may filter information on the system based on content criteria or system user criteria. The generated filter channel may also aggregate selected channels together in one filtered channel, and this aggregated filtered channel may be used to post a message to multiple channels at one time.

According to another aspect of the present invention, the system may further include a program which is operative to maintain and provide the status of system users. The system may further include an application computing system having an application program and a system interface program loaded on it. According to this aspect of the present invention, the application program, when executed, interacts with the system interface program to provide data to the network. The data sent to the network by the application program may be notification messages.

According to another aspect of the present invention, a method for managing information over a network having real-time chat communication channels includes generating a user interface on an end user computing system which establishes a real-time chat communication connection over the network, accessing a real-time chat channel through the user interface and using the user interface to customize the information gathered and presented on the user interface. The method may further include customizing the information gathered and presented on the user interface by generating a filtered channel. The method may further include monitoring the availability of system users. According to another aspect of the present invention, the method includes providing an application program and communicating between the application program and the user interface over the network. In another aspect of the present invention, the method may include posting contextual chat messages on the user interface when a channel is accessed.

According to another aspect of the present invention, a computer-readable medium having computer-executable instructions for performing a method over a network having real-time chat communication channels includes a method for generating a user interface on an end user computing system which establishes a real-time chat communication connection over the network, for accessing a real-time chat channel through the user interface and for using the user interface to customize the information gathered and presented on the user interface.

BRIEF DESCRIPTION OF THE DRAWINGS

These and other features, aspects, and advantages of the present invention will become better understood with regard to the following description, appended claims, and accompanying drawings where:

FIG. 3 depicts a user interface of the present invention;

FIG. 4 depicts a channel manager of the present invention;

FIG. 7 depicts a window from which a user can select a file to be posted;

FIG. 8 depicts a user interface in which a user has posted a file;

FIG. 12A depicts an example of an interface in which a user can enter filtering criteria;

FIG. 12B depicts another example of an interface in which a user can enter filtering criteria;

FIG. 12C depicts yet another example of an interface in which a user can enter filtering criteria;

FIG. 13A depicts a filtered channel for the filter of FIG. 12A;

FIG. 13B depicts a filtered channel for the filter of FIG. 12B;

FIG. 14 is a flow diagram depicting how a multipost channel works;

FIG. 20A depicts an interface in which a user enters status information related to a scheduled event;

FIG. 20B is a flow diagram relating to the manner in which the user's status related to an event is updated;

FIG. 29 depicts a user interface in which a channel manager enters permissions for channels managed by the channel manager;

FIG. 30 depicts a user interface in which a channel manager selects channel management options;

FIG. 33 depicts a user interface window in which a transcript is displayed;

FIG. 36 depicts a user interface window in which a user can select the statistics for particular channels or users from particular timeframes he or she wishes to review;

FIG. 37 depicts a dialog box in which a user must enter his or her usemame and password in order to gain access to the statistics.

DETAILED DESCRIPTION OF THE INVENTION

Figure 1:
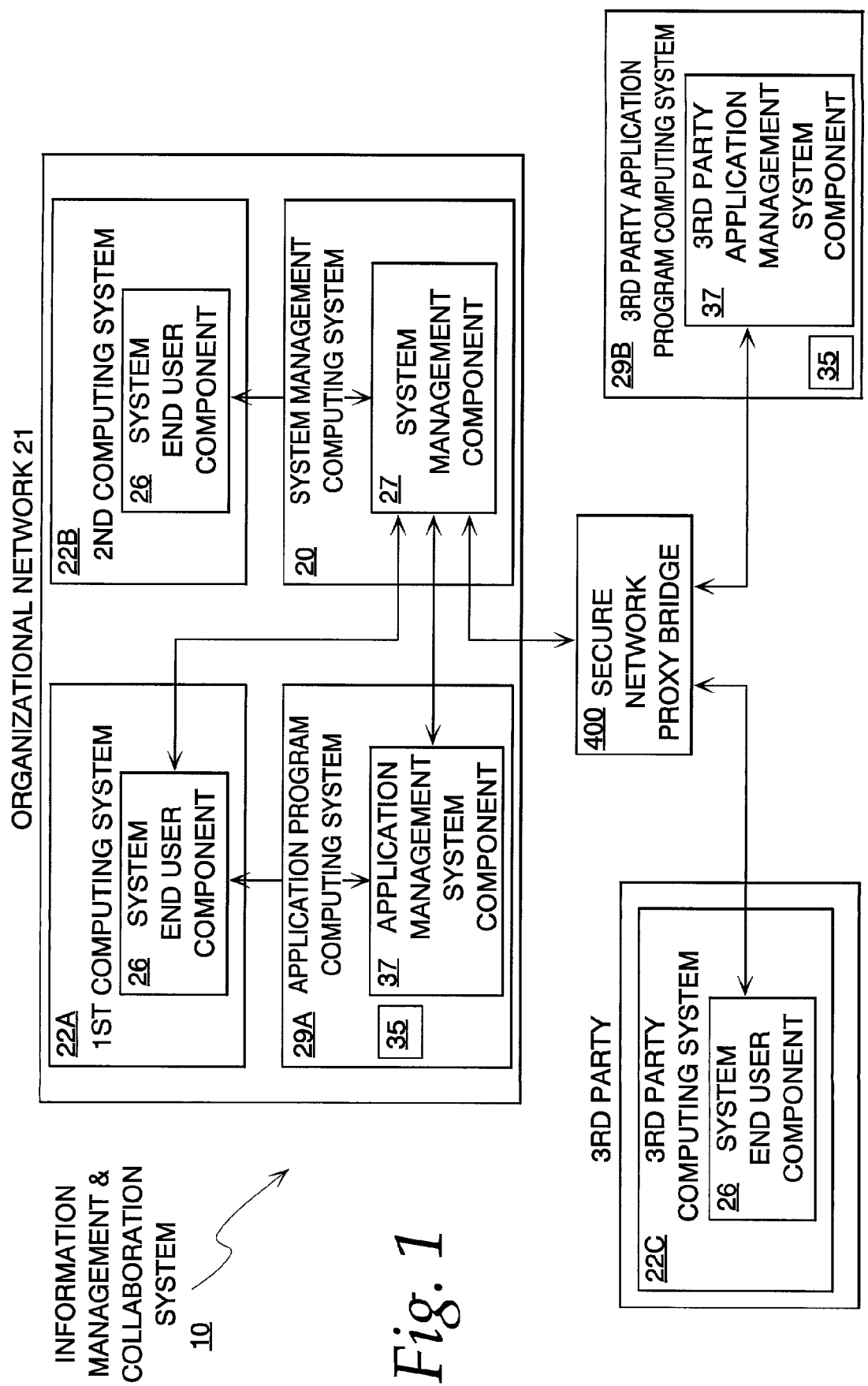
FIG. 1 depicts an information management and collaboration system.

Referring to FIG. 1, the system 10 of the present invention operates in a computer networked environment, such as the Internet, campus/corporate intranets, or extranets with real-time chat capabilities using known protocols. The system 10 of the present invention may include a multitude of end user computing systems 22 and a number of application program computing systems 29 networked with a system management computing system 20 in a secure organizational network 21. The system 10 may also include third party systems that link into the organizational network 21 through a secure network proxy bridge 400. The secure network proxy bridge 400 may include an external firewall server, an external messaging server and an internal firewall server. In this configuration, the external firewall server serves as a bridge connecting users on an external network to the external messaging server which connects to the internal firewall and ultimately to the secure organizational network 21. These third party systems may include a third party computing system 22c and a third party application program computing system 29b. The computing systems 22 described herein may include any type of input and output devices and are well known in the art. For example, such computing systems 22 may include personal computers, personal digital assistants, wireless/cellular phones and pagers. For purposes of clarity of explanation, however, only a first and second computing system 22a, 22b are illustrated in FIG. 1 within the secure organizational network 21 and discussed herein. The principles explained herein apply to any number of computing systems 22 that are added to the network. In this embodiment, each of the first and second computing systems 22a, 22b and the third party computing system 22c have a system end user component 26 stored thereon. In this embodiment, the system management computing system 20 has a system management component 27 stored thereon. The application program computing system 29a and the third party application program computing system 29b each have a application management system component 37 and a utility/application program 35 loaded thereon.

The computing systems 22 and the application program computing systems 29 interact with one another over the network and over the secure network proxy bridge 400 through the system management computing system 20. The system management computing system 20 manages and facilitates the interactions between the computing systems 22 and the application program computing systems 29 on the network, including facilitating the transmission of electronic messages between the computing systems 22 and application program computing systems 29, maintaining the status of the users of the system 10, serving as a file repository for the system users, and having various other features described in detail below. It should be appreciated by those skilled in the art that, while specific computing systems are shown and described, the functionality of the computing systems may be further separated or combined on an individual basis.

Computing System

Figure 2A:
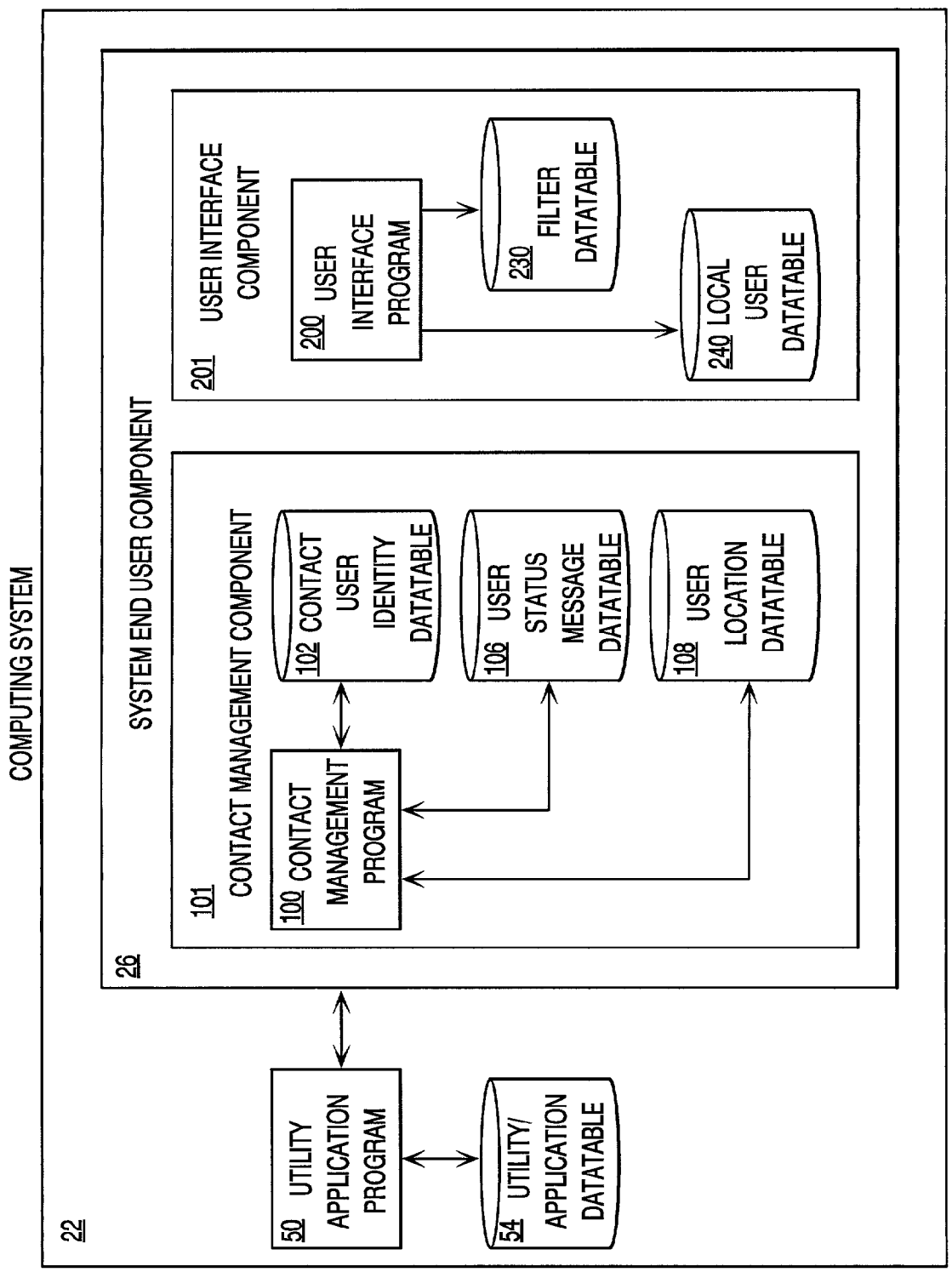
FIG. 2A depicts an exemplary computing system of the present invention.

Referring to FIG. 2A, the system end user component 26 stored on the computing systems 22 of the present invention includes a contact management component 101 and a user interface component 201 in the embodiment depicted. The contact management component 101 includes a component program 100, a contact user identity datatable 102 which contains information concerning the end users of the computing systems 22, a user status message datatable 106 which contains information regarding the status of end users on the system 10 and a user location datatable 108 which contains information concerning the location of the user. The contact management program 100 interacts with the system 10 to give a user a tool from which he or she can manage contacts and obtain information concerning contacts. The user interface component 201 includes a user interface program 200, a filter datatable 230 and a local user datatable 240. The user interface program 200, in cooperation with related datatables, generates an interface through which the user can interact with the system 10. Through the generated user interface, a user is able to enter structured or unstructured information, receive structured or unstructured information, transfer or receive files, access aspects of the contact management program 100, view listings of channels, and perform other system tasks which are described in detail below. Structured information is entered or received as discrete parameters of data. The programs of the system end user component 26 may interact with any utility application 50 such as a calendar program, an electronic mail program, a word processing program, a spread sheet program, an image program, a sound program, or any other locally stored program. A utility/application datatable 54 is located on the computing systems 22 for interaction with the utility application 50. Preferably, the utility application 50 and the utility/application datatable 54 are stored locally on the computing system 22; however, the utility application 50 and the utility/application datatable 54 may be stored on any computing system located within the system 10 which may be accessed by the computing system 22.

System Administration Computing System

Figure 2C:
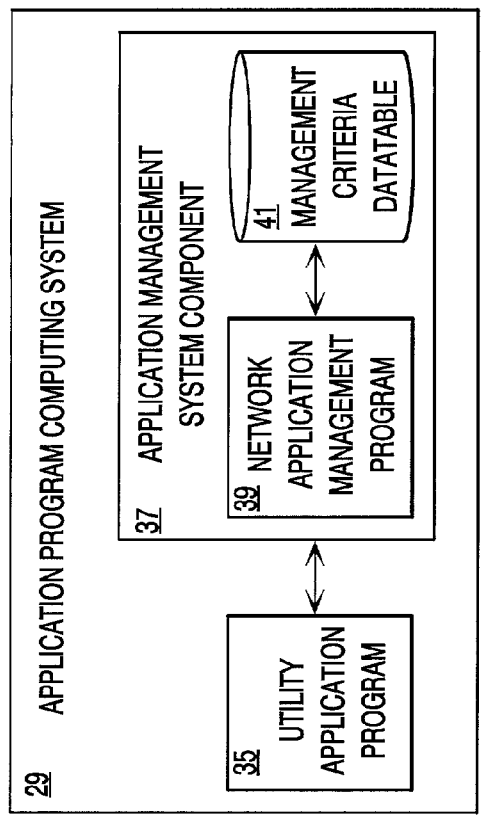
FIG. 2C depicts an application program computing system of the present invention.
Figure 2B:
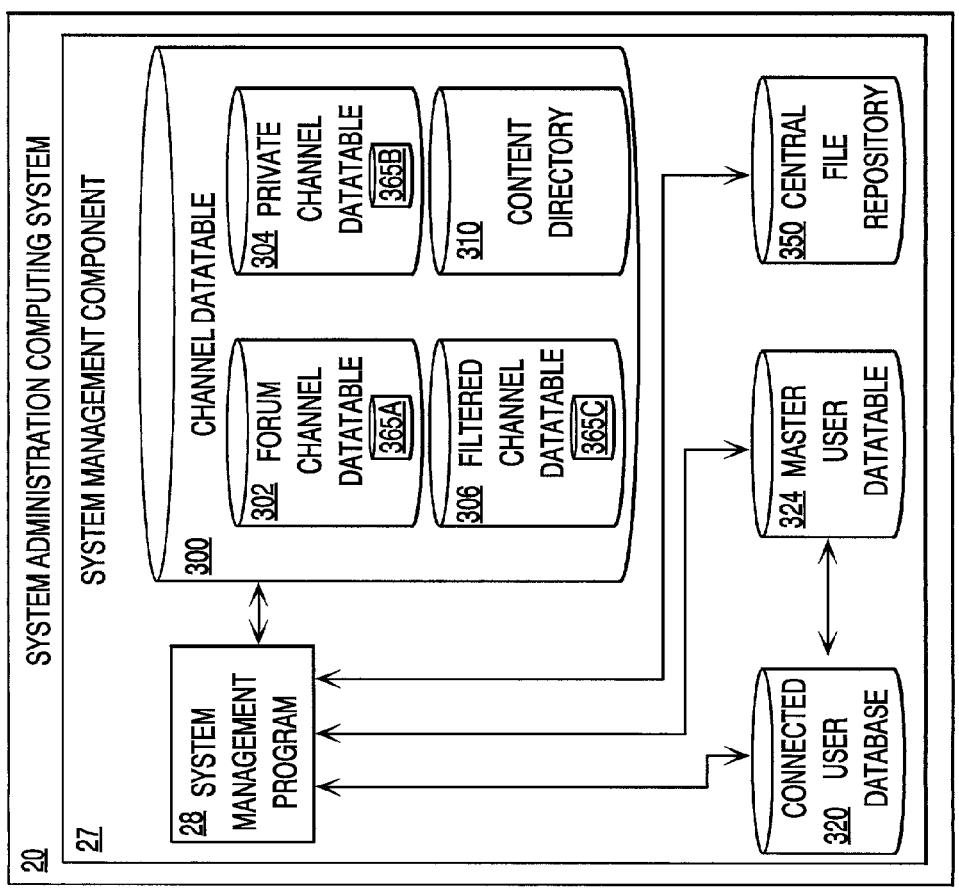
FIG. 2B depicts a system administration computing system of the present invention.

Referring to FIG. 2B, the system management component 27, stored on the system administration computing system 20 includes a system management program 28, a channel datatable 300, a connected user datatable 320 and a master user datatable 324. The system management program 28, in cooperation with the related datatables, manages the channels and generates various pieces of information about contacts and for contacts, such as maintaining a contact user identity list, identifying a user's identity, providing a user status message, indicating the location of a user, and other tasks which are described in detail below. Channel datatable 300 contains information concerning the various channels that are present on system 10. Connected user datatable 320 contains information about the users that are connected to the system 10. In the preferred embodiment of the system of the present invention, channel datatable 300 includes a forum channel datatable 302, a private channel datatable 304, a filtered channel datatable 306 and a content directory 310. The master user datatable 324 contains contact information concerning the users of the system 10, and information about the status of users of the system, including custom availability messages for particular users.

The system management program 28 logs channels as specified and stores the contents in a transcript datatable 365, wherein the transcript datatable is contained within the channel datatable 300. In the preferred embodiment, each channel datatable such as forum channel datatable 302, private channel datatable 304 and filtered channel datatable 306 includes a transcript datatable 365a, 365b and 365c, respectively.

A central file repository 350 is also part of the system management component 27 and is used as an intermediate destination in the transferring of files that are posted by users.

Application Program Computing System

Referring to FIG. 2C, the application management system component 37, stored on an application program computing system 29, includes a network application management program 39 and a management criteria datatable 41. A utility/application program 35 is also stored on the application program computing system 29. The utility/application program 35 interacts with the network application management program 39 to post messages to the system 10.

System Operation

To use the system of the present invention, a user, through an input device on his or her computing system 22 activates the user interface program 200 (FIG. 2A) of the end user system component 26 by clicking an icon or by triggering some other activation mechanism to generate a user interface 30 similar to the one depicted in FIG. 3. The generated user interface 30 has an application title bar 32, a menu command bar 34 and a toolbar 36. The menu command bar 34 may include a Channel menu 60, an Edit menu 62, a User menu 64 and a Window menu 66. The toolbar 36 may have various selectable icons, including a dock all channels icon 38, a dock displayed channel icon 39, a user identification icon 40, a filtered channel creation icon 42, a public forum creation channel icon 44, a private channel creation icon 46, a channel manager selection icon 48, a channel preferences icon 50 and a file post icon 52. In the user interface 30 depicted in FIG. 3, no system channels are yet opened. System channels are network communication channels which allow users on the system 10 to interact with one another over system 10. There are different types of system channels that a system user can use. In this embodiment, as discussed in detail below, there are forum channels, private channels, filtered channels and one-way channels. A forum channel is a public channel, usually directed to a specific topic, open to everyone on the system 10 through which two or more system users can communicate. A private channel is a secure, private channel between two system users. No one else on the system 10 can see the information passed between the users of a private channel. A filtered channel is a channel which contains content from other channels that satisfies filtering criteria that the system user establishes. Finally, a one-way channel is a channel which allows the user to receive information, but not to send information out.

To review or join the system channels or to review, create or manage his or her channels, a system user opens a channel manager 40 (FIG. 4). To open the channel manager 40, the user may click on the channel manager icon 48 located on the toolbar 36 of the user interface 30 or the user may use any other mechanism programmed into the system 10 (e.g., selecting an option from the Window menu 66 to open the channel manager or entering a keystroke combination on the computing system's keyboard). Referring to FIG. 4, when the channel manager 40 is opened, the user interface program 200 retrieves channel information from the channel datatables 300 on the system management computing system 20 for display in the channel manager 40.

The channel manager 40 illustrated in FIG. 4 has a window title bar 70, a menu command bar 72 and a toolbar 74 which are all similar to the features on the user interface 30. The channel manager 40 also has four tabbed screens 80a-80d, a channel name input field 89, a channel "Open" button 90, a channel "Create" button 92 and a loaded channel indicator 94. The first tabbed screen 80a is a group chat or public forum channel screen. The second tabbed screen 80b is a private channel screen and is opened when the user clicks on the "Private" channel screen tab. The third tabbed screen 80c is a filtered screen and is opened when the user clicks on the "Filtered" channel screen tab. The fourth tabbed screen 80d is a system user screen and is opened when the user clicks on the "User" screen tab. The information that the user interface program 200 retrieved from the channel datatables 300 when the channel manager 40 was opened populates the fields of the tabbed screens 80a-80d.

Channel information for a set of exemplary forum channels is illustrated on the forum channel screen 80a depicted in FIG. 4. Each row 81 of the forum channel screen 80a provides information on a specific public forum channel on the system 10. A symbol 83 in the first column 82 of each row 81 indicates what type of channel the channel is. In FIG. 4, since every channel on the forum channel screen 80a is a public group chat channel, the public forum symbol is depicted in every row 81 of column 82. The second column 84 of each row 81 specifies the forum channel's name. In the example depicted, the forum channel name for the first row forum channel is "#aida". The third column 86 of each row 81 lists the numbers of users that are members of that channel. The forum channel "aida" has sixteen members. The fourth column 88 of each row 81 contains a topic heading for that channel or some other channel descriptor.

Figure 5:
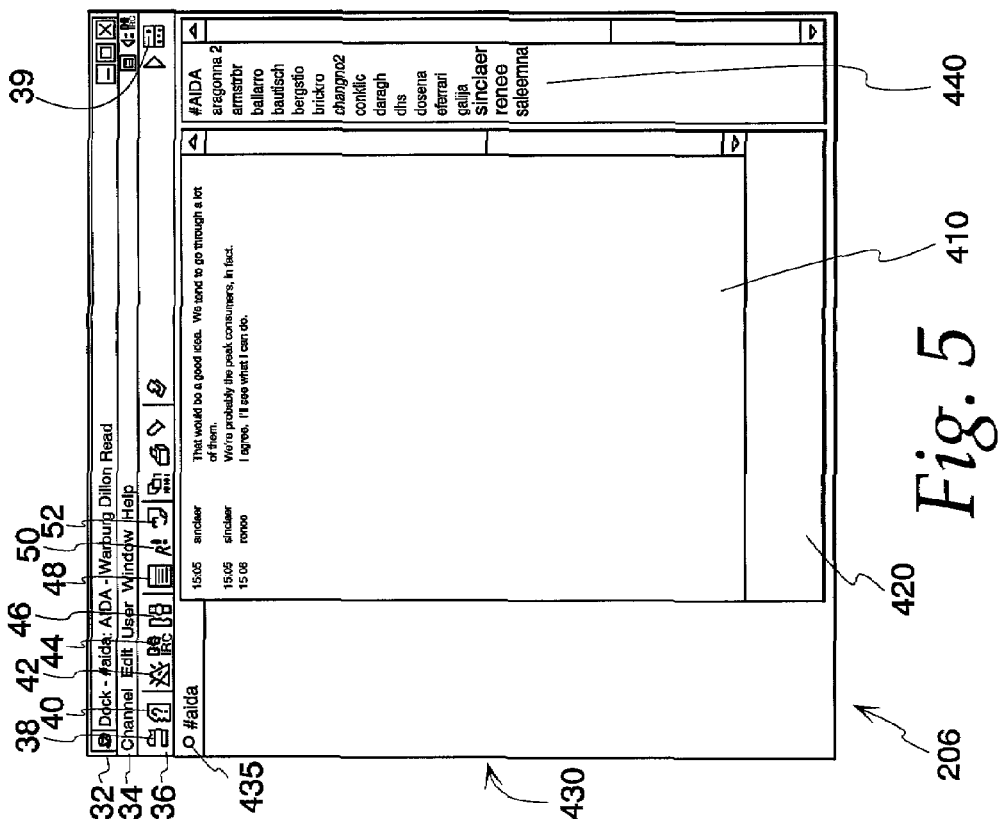
FIG. 5 depicts a user interface having a channel window.

To join an available channel, a system user double-clicks on the row 81 containing the channel he or she wants to join or the user enters the name of the channel he or she wants to join in the channel name input field 89 and then clicks on the channel "Open" button 90. In response to either of these actions, the system management program 28 opens a real time communication channel and joins the user to the selected channel by updating the appropriate channel datatable 300 to include the user as a member of the selected channel. Creating a channel is very similar. The user enters the name of the channel he or she wants to create in the channel name input field 89 and then he or she clicks on the channel "Create" button 92. The system management program 28 then opens a real-time communication channel and creates the channel on the appropriate channel datatable 300. Referring to FIG. 5, upon a user's joining or creation of a channel, the system management program 28 interacts with the user interface program 200 to create a channel window 206. The channel window 206 is populated with information from the channel datatables 300 for the channel selected on the user interface 30 for the user. A channel window 206 includes a chat content area 410, a message input area 420, a channel identifier area 430 and a channel user listing area 440. The channel content area 410 displays the chat messages for the selected channel. As a system user joins a channel, he or she is brought right into the real-time conversation flow, and the chat content area is populated with contextual chat, which is prior synchronous system data that has been archived and retrieved in an asynchronous manner, for the channel selected. For instance, in the example depicted in FIG. 5, the user is entering into the real-time discussion between "sinclaer" and "renee", and the user is presented with the last three chat messages between "sinclaer" and "renee" in the "#aida" channel. The major advantage of this contextual chat feature is that a user joining a channel can quickly determine the topic of the discussion thread and can immediately contribute synchronously to the on-going discussion without having to ask the channel members to bring him up to date on what is being discussed or wait to determine what is being discussed. The number of contextual messages displayed to a new channel entrant may be set by a channel administrator. The number of messages displayed may be set based on the number of previous messages in the channel, based on the number of previous lines of messages in the channel, based on all messages back to a certain time or by some other selection criteria. In a preferred embodiment, the last thirty messages in the channel are posted for the user's review.

Figure 6:
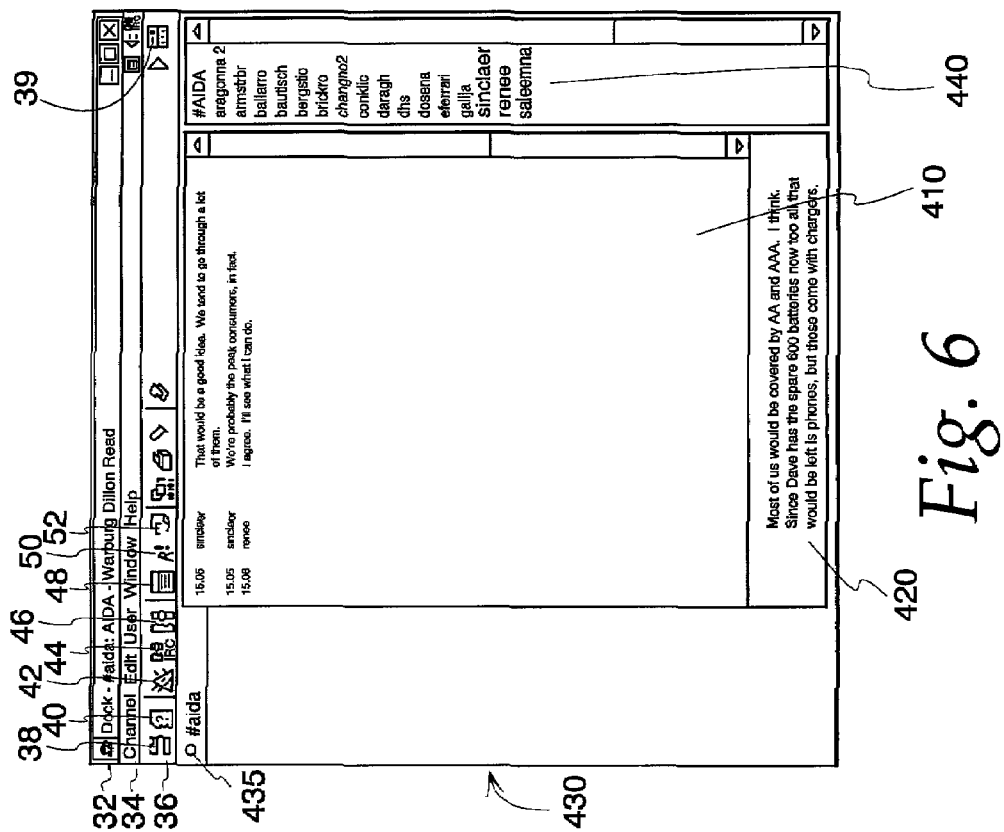
FIG. 6 depicts a user interface in which a user has entered text to be communicated to other channel participants.

To post a message to a channel, the user has a number of options. Some of these options may include posting the message as a standard chat message with or without an embedded hyperlink, posting a file to the channel, posting an application notice or posting the message using structured message input panels. Referring to FIG. 6, the user in this example has typed his message into the message input area 420 and transmitted to post his message in real-time chat to the "#aida" channel for all of the members presently online to see. The system management program 28 and the user interface program 200 may be configured so that certain types of information in a message are converted to into an embedded hyperlink which members of the channel may click on to get to the actual resource. Types of information posted in a message that might cause the system 10 to generate an embedded hyperlink might include messages that post a file to the channel, that post a Uniform Resource Locators (URL's), that post a user ID or that post specialized data. The embedded hyperlink portion of the posted message is marked with a special indicator, such as highlighting or underlining, to indicate to the channel members that the marked portion of the message may be clicked on to take the inquiring member to a primary resource on the discussed topic. In the URL example, if a channel member clicks on the marked portion of a message, the user interface program 200 would interact with a browser program resident on the computing system 22 to take the inquiring channel member to the URL linked to the message. In certain instances, the system programs may be set so that when a channel member right clicks over the marked portion of a message, a menu is generated to give the channel member some options as to what he or she wants to do. For instance, if the marked portion of the message was a stock symbol, the menu generated by right clicking over the marked portion of the message might generate a list of web sites (e.g., quote.yahoo.com or altavista.com) for the inquiring channel member to go to find more information on the company represented by the stock symbol.

Another robust aspect of the system 10 is the ability of system members to exchange files between one another for markup and revision in real-time. To post a file to a channel, the user clicks on the file post icon 52. In response, the user interface program 200 generates a file selection interface 450 similar to the one depicted in FIG. 7. From the file selection interface 450, the user selects which file he or she wants to post to the channel and clicks on the "Open" button 452. The user program interface 200 and the system management program 28 then interact to send the actual file to the central file repository 350 on the system management computing system 20 (FIG. 2B) and, as illustrated in FIG. 8, to post a message 460 on the selected channel containing an embedded hyperlink to the actual file that is stored in the central file repository 350. In this example, the posted file is "ClaimTemplate.doc". In this configuration, the selected file is not physically sent to every member of the channel; rather, a pointer is provided, in the form of an embedded hyperlink contained in the message 460, for the channel members to click on when they are ready, if ever, to use the posted file. The posted file is seamlessly transferred through the central file repository 350 from the user's perspective.

Figure 9:
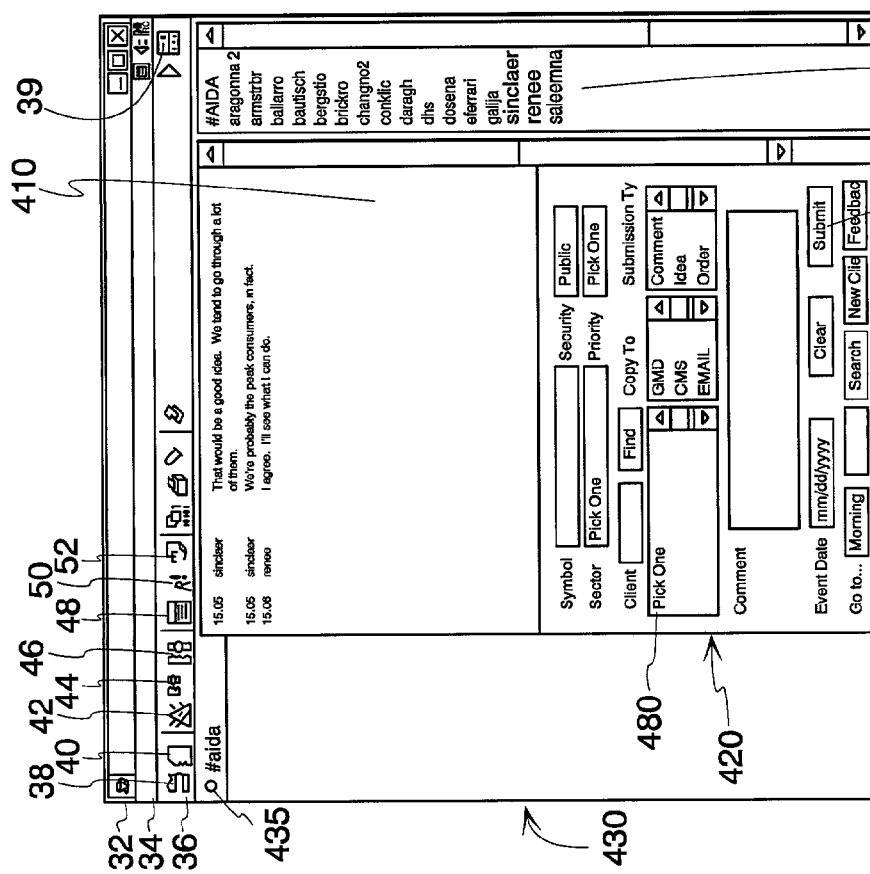
FIG. 9 depicts a user interface in which a structured input panel is present.

System users can also post structured input messages to the system 10. By selecting a channel for which structured input panels are to be displayed, a structured input panel 480 is generated in the message input area 420 of the channel window 206 as illustrated in FIG. 9. Structured input panels 480 are effective for communicating with parts of the system 10 that require input data in a specific format. The program that generates a specific structured input panel 480 may be integrated with the compiled source code of the user interface program 200 or it may be generated from configuration instructions in, read by, or received by the user interface program 200 at run time. Referring to FIG. 9, to use a generated structured input panel 480, the system user fills out the fields of the structured input panel 480 and posts the message to the system 10 by clicking the "Submit" button 482. The user interface program 200 and the system management program 28 interact to either process the data locally before transmitting the processed data over the network or to transmit the data to specific channels over the network or to format the submitted data and transmit it to either an internal or external application program 35. The data is transmitted over the network using network calls, such as remote procedure calls (RPC's) or HTTP calls, together with some form of platform interoperability architecture, such as CORBA, and a data formatting scheme, such as Extensible Markup Language (XML). The processing instructions for processing the data may be written in any suitable scripting language that can be interpreted by the user interface program (e.g., Java, JavaScript or Python).

Figure 10A:
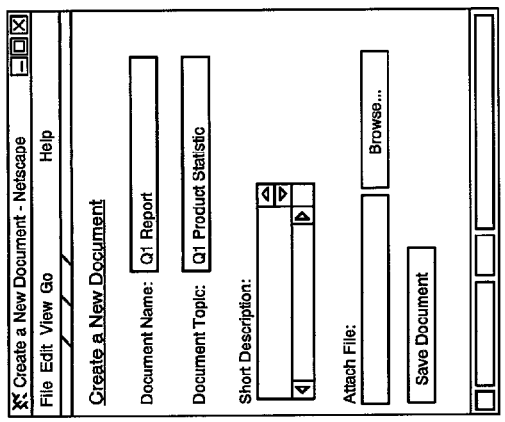
FIG. 10A depicts a document management program interface.
Figure 10B:
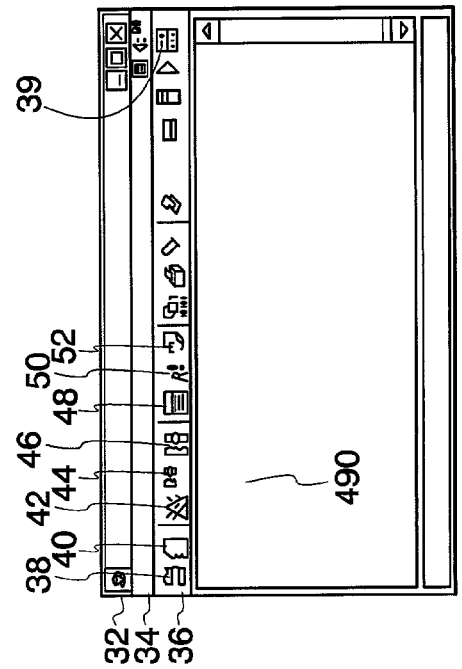
FIG. 10B depicts a user interface including a document notification message.

Another robust feature of the system 10 is that utility and application programs, stored either locally on an end user computing system 22 or on an application program computing system 29, can communicate triggering events directly with system users through the system channels to provide system users with real-time, current notification information. An example is depicted in FIGS. 10A-B. FIG. 10A shows that John Doe has created a new document called "Q1 Report" and is saving it to a network document management system (a network utility/application program 35) resident on an application program computing system 29. Once saved, the utility/application program 35 then interacts with the network application management program 39 and the management criteria database 41 to post a notification message 490 (FIG. 10B) on certain channels of the system 10. The network application management program 39 generates this notification because it was pre-programmed to send notifications to certain users or channels on the system 10 whenever John Doe creates or modifies any documents in the network document management system.

Multiple Channels

Figure 11:
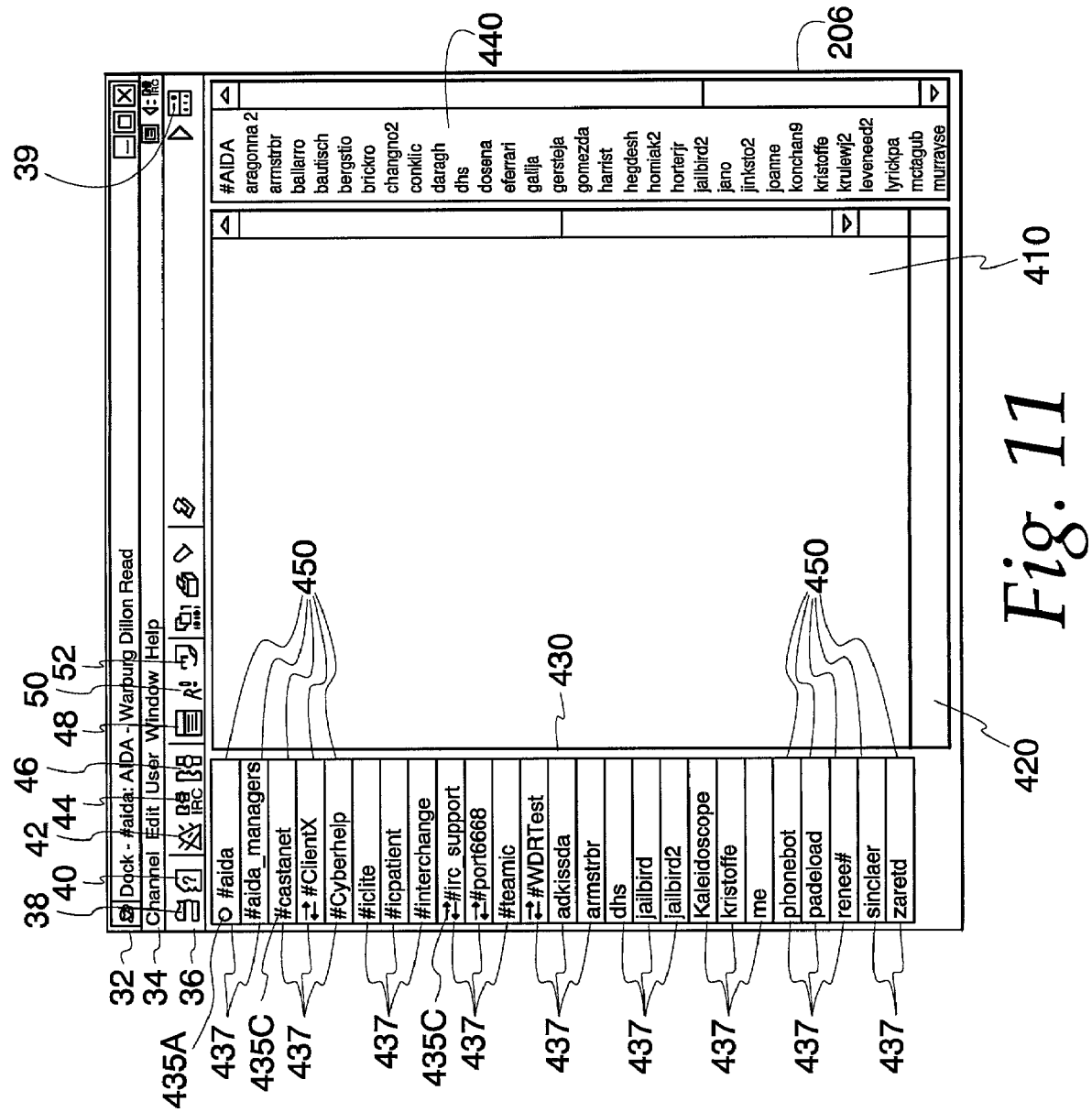
FIG. 11 depicts a user interface in which a user has joined multiple channels.

As illustrated in the channel identifier area 430 of the user interface 30 of FIG. 11, a system user may join or create other channels to become a member of multiple channels. In addition to the public forum channels described above, other types of channels can be joined or created in the system 10, such as private channels, filtered channels and one-way channels. A user's channel preferences are saved by the system 10 so that whenever a user opens his or her user interface 30, no matter where they are on the network, his user interface 30 populates with all of the channels he saved, and he can get immediately back into the conversation and collaboration flow without having to manually re-load all of their previously saved channels. For additional reliability, such as for times in which the preferences are not accessible over the system 10, a user's channel preferences are also stored on the computing system 22 in the local user datatable 240.

To create a private channel, a user clicks on the private channel creation icon 46. In response to selecting this icon, the user interface program 200 in conjunction with the system management program 28 generates a system user list for the channel creator to select from. The channel creator selects from the generated list which other system user he or she wants to have a private channel with. Once the other user is selected, the channel creator creates the channel, and the system programs update the channel datatables 300 and create a channel window 206 on the user interface 30. A system user can also create a private channel through the contact management component 101 described below. A system user can also join a previously created private channel by going to the channel manager 40 (FIG. 4), clicking on the tab for the private channel screen 80*b* and selecting a channel to join from the list on the screen.

Within a large organization, there is a massive amount of information flow. To help manage this information flow, the system 10 allows users to set up filtered channels in which only focused information meeting the user's search criteria is presented. Filtered channels may be public, forum channels or private channels. The system 10 allows the user to filter based on an aggregation of channels (i.e., search for all content on channels "#linux", "#Java" and "#OpenSource"), based on specific content across all channels (i.e., search for uses of terms "buy" and "stock" across all channels), based on the use of a specific user name across all channels (i.e., search for the name "trader1" on all channels) or based on any combination of these criteria. To create a filtered channel, a user clicks on the filter channel creation icon 42 of the user interface 30 (FIG. 11). By selecting this icon, the user interface program 200 in conjunction with the system management program 28 generates a filtered channel creation interface 600, as illustrated in FIG. 12A. The filtered channel creation interface 600 includes three tabbed screens: a channel tabbed screen 1322, a user tabbed screen 1324 and a content tabbed screen 1326. The interface 600 further includes a filter name entry field 620, a stored search criteria area 622, a search criteria entry field 624, a search criteria "Add" button 626, a channel description area 628, a "Clear Information" button 630 and a "Create New Channel" button 632. To create the filtered channel, the user enters the name of the channel in the filter name entry field 620 and selects the screen tab 1322-1326 for the type of criteria the user wants to search by. In the example in FIG. 12A, the user is searching based on content and has selected the content tabbed screen 1326. In the example in FIG. 12B, the user is searching based on names of channels and is effectively aggregating the content of multiple channels into one filtered channel. In the example in FIG. 12C, the user is searching based on a system's users name, and the user tabbed screen 1324 has been selected. Referring to the example depicted in FIG. 12A, the channel creator is searching across all system channels available to the channel creator for any uses of the terms "buy" 1312 or "sell" 1314 or "JPY" 1316 or "USD" 1318 by specified users ("armstrbr", "trader1" or "trader2"). The channel description area 628 describes the search criteria for the channel. In the example in FIG. 12B, the channel creator is aggregating the content for the channels "#linux", "#Java", "#OpenSource" and "#JavaScript" for all users of those channels into one channel labeled "AggregateChannelExample". Referring to the example depicted in FIG. 12C, the channel creator is searching across all system channels available to the channel creator for any content sent by the user, "adkissda".

To create the channel, the channel creator clicks on the "Create New Channel" button 632 or, if the channel creator wants to clear the search criteria, he or she can click on the "Clear Information" button 630 to clear this information. Once a filtered channel is created, the user interface program 200 stores the filtering criteria in the filter datatable 230. Further, the user interface program 200 interacts with the system management program 28 to store the selected filtering criteria and related channel information on the filtered channel datatable 306 of the channel datatables 300. In one embodiment, the user interface program 200 monitors all the system channels to find any information that fits the stored search criteria stored in the filter datatable 230 and then, as illustrated in FIGS. 13A-B, posts any information that meets the saved criteria to a channel window 206 on the channel creator's user interface 30. Filtering may also be performed by the system management program 28 using the filtering criteria stored in the filtered channel datatable 306. The example depicted in FIG. 13A is a channel window 206 generated based on the search criteria entered in the example in FIG. 12A. The user interface program 200 identified that a message 650 from "armstrbr" was sent on the "#bskitest" channel and that it included the search term "JPY". The channel window 206 in this filtered channel example also includes a searched user area 630 which lists all of the users' messages that are being filtered for that channel. In this example, messages from users, "armstrbr" 634, "trader1" 636 and "trader2" 638, are being monitored. In the example depicted in FIG. 13B, the information in the channel window 206 is generated based on the search criteria entered in the example in FIG. 12B. The user interface program 200 aggregated all of the content from the channels "#Java", "#JavaScript", "#linux" and "#OpenSource" into the channel window 206 for the "AggregateChannelExample" channel. The channel window 206 in this example, which is similar to that of the example depicted in FIG. 13A, includes an aggregated channel area 680 which lists all of the channels that are being aggregated. In this example, the channels, "#Java", "#JavaScript", "#linux" and "#OpenSource", are being aggregated.

Use of the filter feature of the system 10 is also an effective tool for sending messages as well. Referring to FIG. 14, a system user 1338, by sending messages/content 1340 through one of his filtered channels (a multi-post channel 1342), is actually sending the same message 1340, as depicted, to a channel 1352 and two additional users 1350, 1354 who were not part of the channel 1352, for whatever reason, but still needed to get the message. This is called multi-posting. This tool is also very effective in posting the same message over multiple channels that are aggregated together. A system user can also review all of his or her previously created filtered channels by going to the channel manager 40 (FIG. 4) and clicking on the tab for the filtered channel screen 80c.

Referring again to FIG. 11, the channel identifier area 430 displays all of the system users open channels. Only one open channel at a time can be the active channel. The active channel is indicated on the user interface 30 by having its channel name in black on its channel tab 437. All other channels are considered inactive, and their names are displayed in gray on their respective channel tabs 437. The system 10, through the interaction between the system management program 28 and the user interface program 200, generates channel alerts and indicators 435 on the channel tabs 437 to assist a system user in managing all of his or her channels. Some of the channel alerts and indicators 435 are described below:

Active Channel With No New Messages Indicator

When there are no new messages in an active channel, an active channel/no new message indicator 435a is displayed. In the example depicted in FIG. 11, the "#aida" channel is the active channel and there are no new messages so the active channel/no new message indicator 435a is present on the channel window tab 437a. In the preferred embodiment, the active channel/no new message indicator 435 is a black 3-D ball icon on the active channel tab 437a.

Inactive Channel and New Content Received Indicator

When an inactive channel in the channel identifier area 430 has received new content, the user interface program 200 generates a new content indicator 435b on the channel window tab 437b. In the example depicted in FIG. 11, the "#irc_support" channel is an inactive channel that has received new content so the inactive channel/new content indicator 435b is present on the channel window tab 437b. In the preferred embodiment, the inactive channel/new content indicator 435b is a combination of turning the name of the channel from gray to blue and generating arrows pointing in opposite directions on the channel tab 437b.

Alert Indicator

When a channel that is not the active channel on user interface 30 and has received new content that the user needs to be alerted to, a new alert indicator is displayed. In the preferred embodiment of the system 10, the new alert indicator consists of the name of the channel turning red and a red exclamation point icon being displayed next to it.

The user interface 30 of the system 10 may include other features that aid the system user in managing the information flow. For instance, the user interface 30 may provide "mouse-over" capabilities. Namely, whenever a user holds his or her mouse over one of the channel tabs 437 for a moment, a window pops up showing the last message posted in that channel without the user having to open that channel. Another useful feature is the ability to "dock" and "undock" channel windows 206 from the user interface 30. When a channel window 206 is initially loaded into the user interface 30, it is docked-meaning that wherever the user interface 30 goes or whatever functions are performed on the user interface 30 (e.g., minimization or maximization), the same operation will occur on the docked channel window 206. The user, however, for a number of reasons, may want to "undock" a specific channel window 206 from the user interface 30. To do so, the user selects a channel window 206 and clicks on the dock displayed channel icon 39. This separates the selected channel window 206 from the user interface and allows the user to move that channel window anywhere on the screen, separate from the user interface 30, and to perform operations on the channel window 206 separate from the user interface (e.g., minimization or maximization). The user can do this with as many channel windows 206 as he wants. When the user wants to re-"dock" the "undocked" channel windows 206 with the user interface 30, the user selects the free-floating channel window 206 and clicks on the dock displayed channel icon 39 again. This re-docks the separated channel window 206 with the user interface 30. To save time and effort, if the user wants to re-dock all of his channel windows 206 to the user interface 30 all at once, rather than wasting time and effort doing it individually, the user may click on the dock all channels icon 38 and that re-docks all separated channel windows to the user interface 30 at one time.

Contact Management Component:

Another important feature of the system 10 is the contact management component 101 of the system end user component 26. The contact management component 101, in conjunction with the system management program 28, allows system users to set their availability for chat over the system 10 and allows other users to check someone's status without having to call them. The contact management component 101 of the system is very powerful and versatile in that it integrates with other office systems that a system user uses to automatically monitor and update the user's availability to chat or attend other office meetings or functions.

Figure 15A:
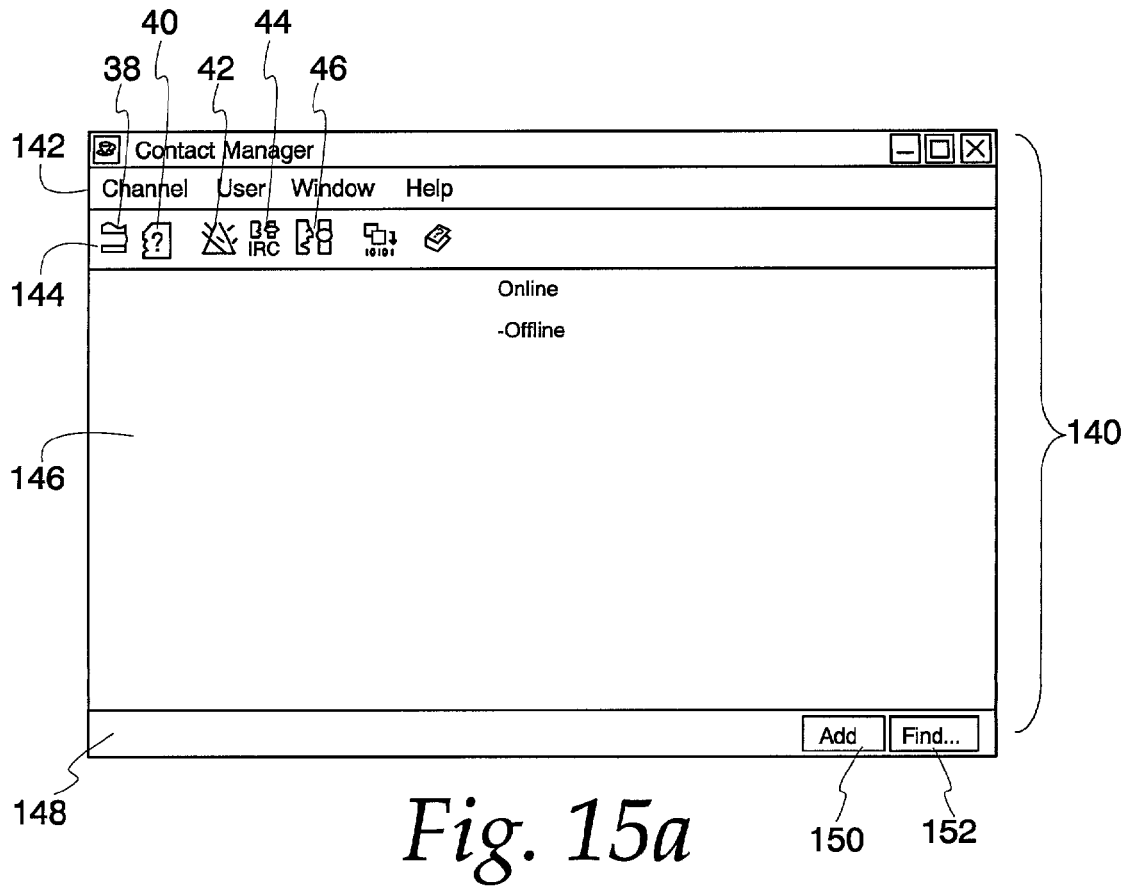
FIG. 15A depicts a contact manager interface.

Referring again to FIG. 11, a system user opens the contact manager 130 of the contact management component 101 by selecting a pull-down option from the Window menu 66 on the user interface 30 or by entering a keystroke combination on the computing system's keyboard or by clicking on an icon. Once opened, the contact management program 100 generates a contact manager interface 140 as illustrated in FIG. 15A. The contact management program 100 interacts with the system management program 28 to retrieve system user information from the user datatable 324. The contact management program 100 retrieves information regarding the user's connection status (e.g., whether the user is on or off line) and regarding the user's availability (e.g., available or unavailable) and displays it in the contact manager interface 140. The contact manager interface 140 includes a menu bar 142, a toolbar 144, a contact user list 146 that includes an online contact user list 146a and an offline contact user list 146b, a contact entry area 148, an "Add" button 150 and a "Find" button 152.

Figure 15B:
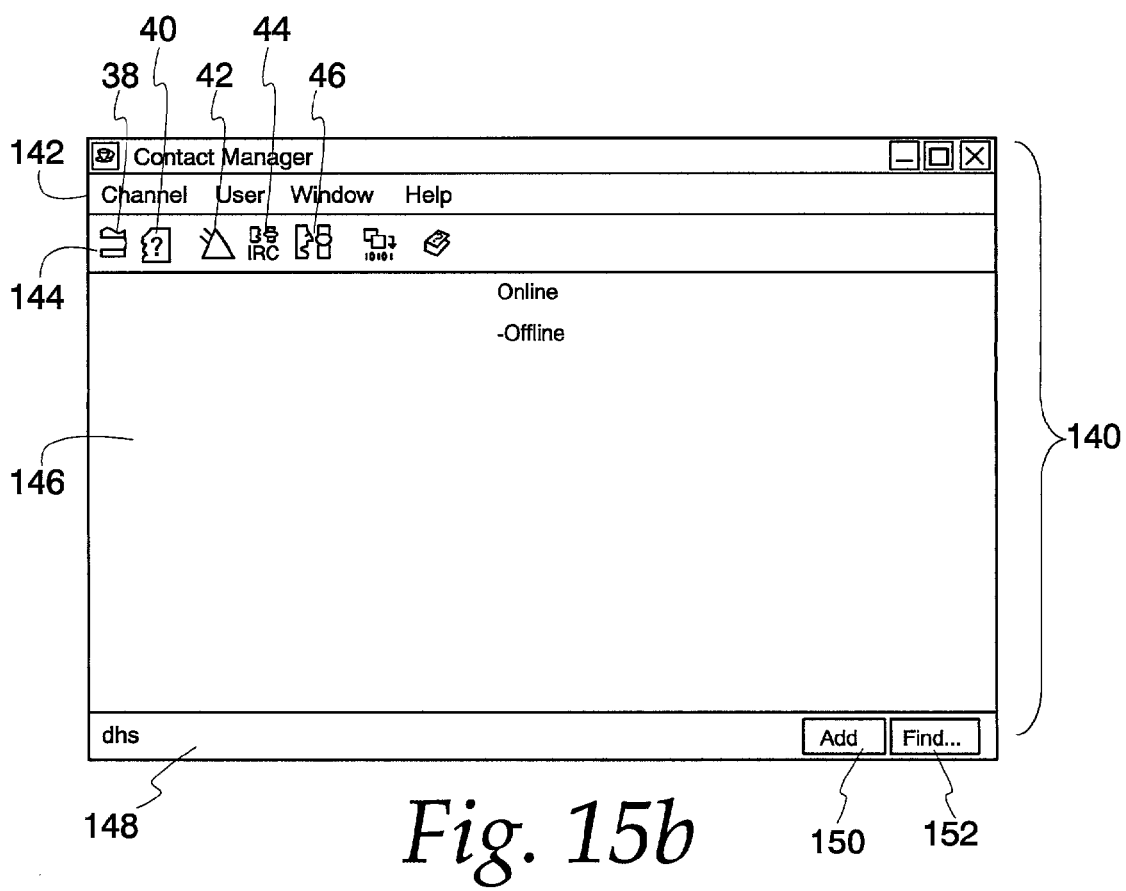
FIG. 15B depicts a contact manager interface in which a user name is being entered.
Figure 15C:
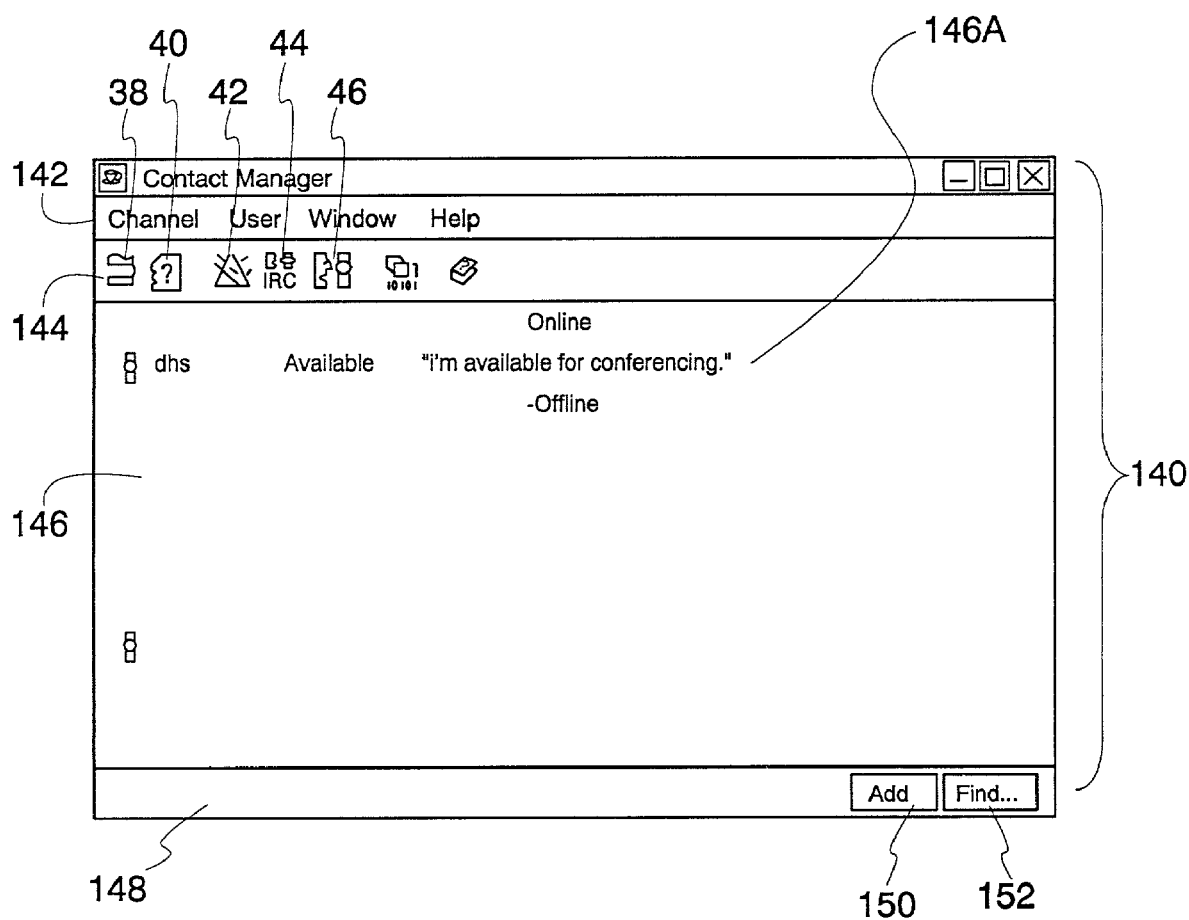
FIG. 15C depicts a contact manager interface in which the entered user's status (i.e., online) is shown.

From the contact manager interface 140, the user may create a list of contact user identities which he or she wants to monitor. Referring to FIG. 15B, to add someone to the list, the contact list creator enters the username of the contact he or she wants to add to the contact user identity list in the contact entry area 148. In the example depicted in FIG. 15B, the contact list creator has entered the username "dhs" in the contact entry area 148. To add "dhs" to his contact management list, the contact list creator clicks on the "Add" button 150. In response, the contact management program 100 updates the user datatables 324 on the system management computing system 20 to add the entered username. Referring to FIG. 15C, since the entered user is online, his or her username now appears in the online contact entry area 148a.

In addition to manually adding contacts, the system 10 provide numerous alternatives for adding contacts to a person's contact user list 146. One way to add contacts to a contact user list 146 is by having the contact management program 100 interact with a locally stored utility/application program 50 on the computing system 22. A contact management integration program installed on the computing system 22, possibly integrated with the contact management program 100, allows for the contact management program 100 and the application program 50 to interact with one another properly. The contact management integration program can include software libraries and instructions for the application program 50 along with special configuration instructions for the contact management program 100.

Figure 16A:
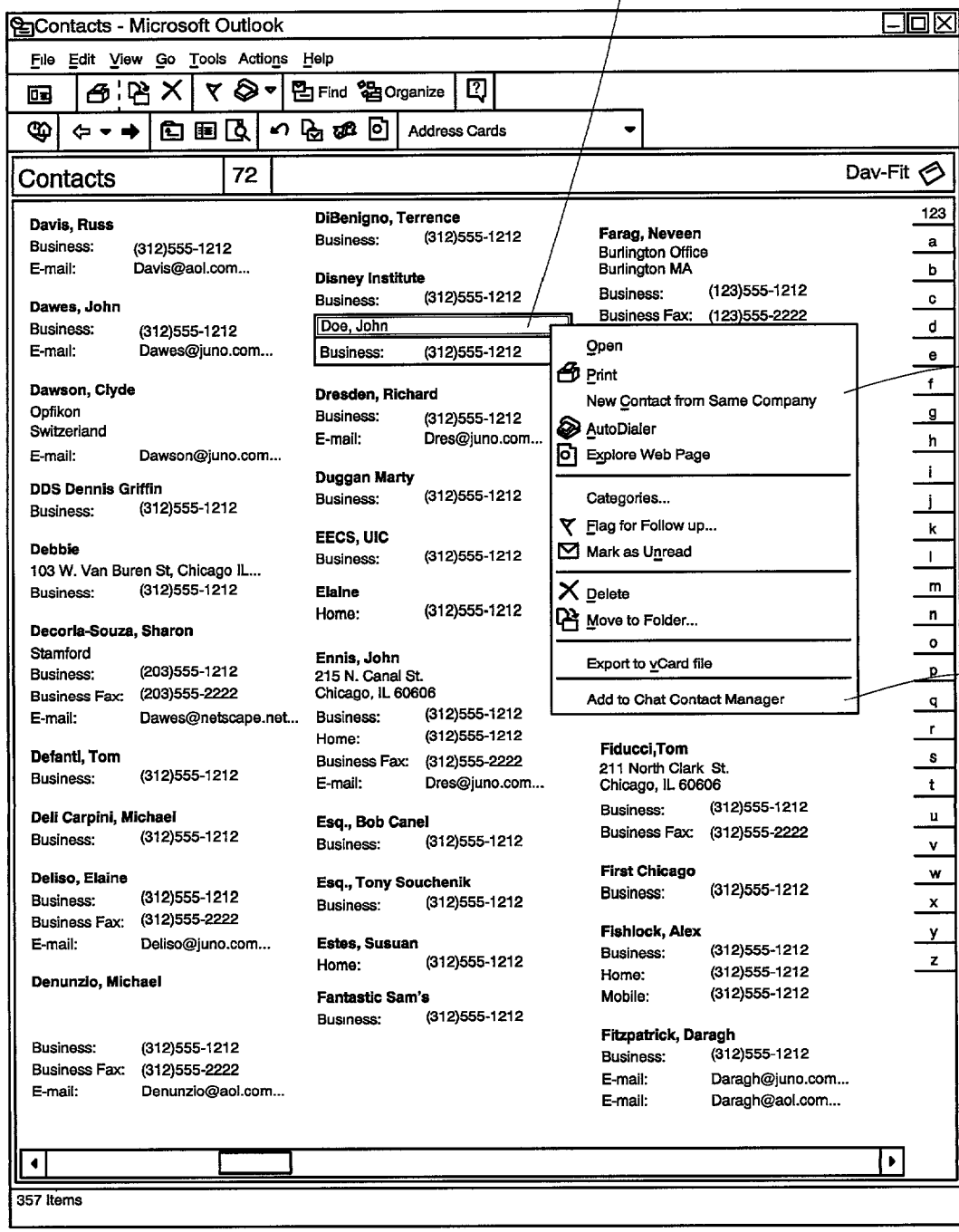
FIG. 16A depicts an electronic mail address book with added functionality.

One such application program 50 in which the application's contact list may be integrated with a system user's contact management list is an electronic mail address book, such as the address book included in Microsoft Outlook™. Referring to FIG. 16A, to integrate contacts from a computing system's electronic mail program with the contact management list on the system 10, the user opens the electronic mail program address book which retrieves the contact information from the utility/application datatable 54 and displays it in the contact list interface 1152. From the contact list interface 1152, the user can select a contact 1156 that he or she wants to add to their system contact list. In response to the selection of a person to add to the system contact list, the contact management integration program generates a menu 1158. To add the contact selected to the system chat contact manager 130, the user selects the "Add to Chat Contact Manager" 1160 or something equivalent from the menu 1158. The integration program will either save the contact to the chat contact manager 130 with all default settings that can be changed later on, if desired, or the integration program will prompt the user for special contact settings when it saves the contact to the chat contact manager 130.

Figure 16B:
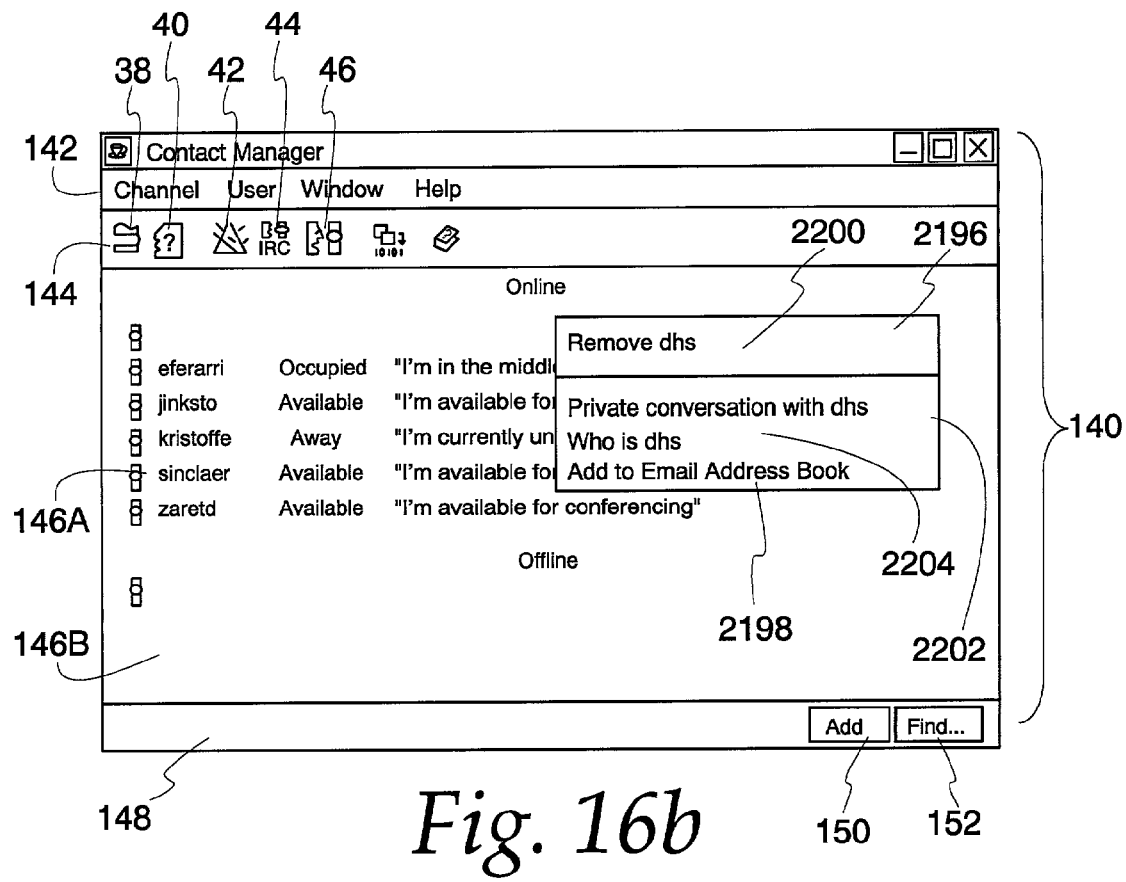
FIG. 16B depicts a contact manager interface in which a usemame can be added to an e-mail address book via a context sensitive menu.

Referring to FIG. 16B, contacts may also be transferred in the opposite direction, from the chat contact manager 130 to the electronic mail address book, as well. To do so, a system user right clicks on the contact name they want to transfer in the chat contact manager 130. Upon selection, the integration program generates a menu 2196. To add the contact selected to the electronic mail address book, the user selects the "Add to Email Address Book" option 2198 or something equivalent from the menu 2196. The integration program will either save the contact to the associated electronic mail address book with default settings that can be changed later on, if desired, or it will prompt the user for special contact settings when it saves the contact to the electronic mail address book. It should be noted that from the menu 2196 a user may also remove a user from his or her contact list with the "Remove" option 2200, he or she may set up a private channel with another system user by selecting the "Private conversation with . . . " option 2202 or they may find out information about another system user by selecting the "Who is . . . " option 2204.

Another way the system 10 may update the chat contact manager 130 is through electronic mail transmissions. In this embodiment, the contact management program 100 updates the user datatable 324 based on e-mail communications. The contact management program 100 does this by monitoring electronic mail communications that a user receives at his or her computing system 22. As the contact management program 100 monitors e-mail transmissions, it references the e-mail senders information against the user datatable 324 (FIG. 2B) on the system management computing system 20 which contains contact information about the e-mail sender. Based on this datatable referencing, the contact management program 100 updates the contact user identity datatable 102 for the chat contact manager 130 with the e-mail sender's information.

Another way the system 10 may update the chat contact manager 130 is through telephone calls. In this embodiment, the contact management program 100 updates the user datatable 324 based on telephonic communications. The contact management program 100 does this by monitoring incoming telephone calls for the user and retrieving the telephone number from the incoming call. The contact management program 100 then references the captured telephone number against the user datatable 324 (FIG. 2B), which contains caller information, and then posts this information to contact user identity datatable 102 referenced by the chat contact manager 130.

Figure 16C:
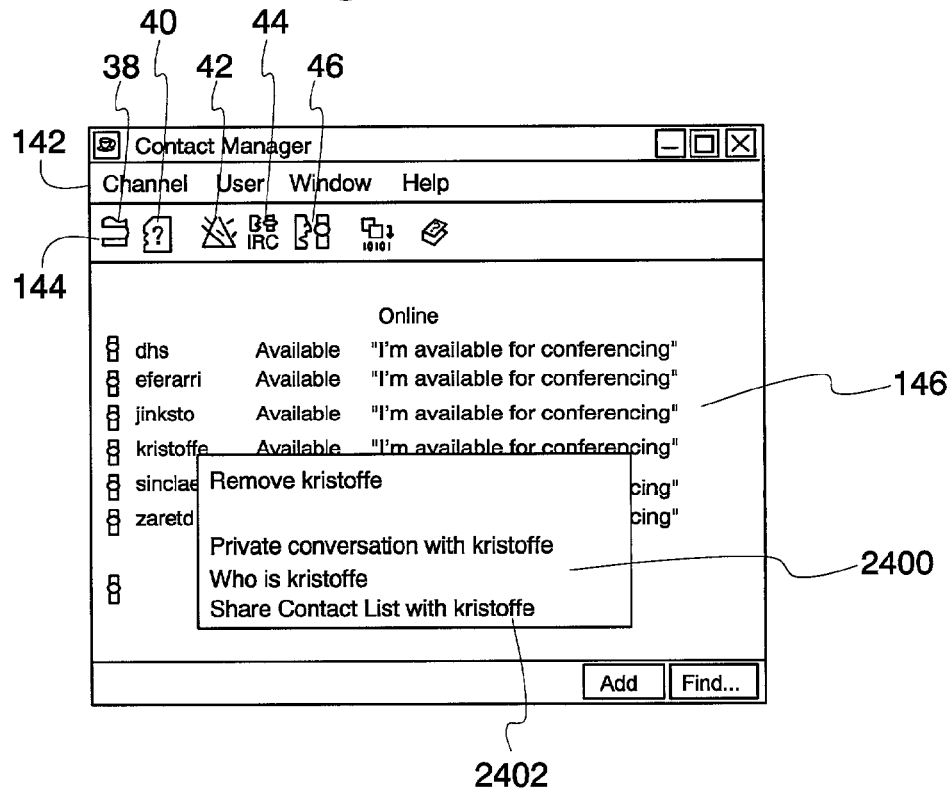
FIG. 16C depicts a contact manager interface in which a contact list can be shared with a selected user via a context sensitive menu.

Referring to FIG. 16C, the contact management system 100 allows for the sharing of the contact user identity datatable 102, or portions thereof. When a user moves the mouse over a contact name listed in the contact user list 146, and clicks the right mouse button, the contact management program 100 generates a menu 2400. The user then selects the "share contact list with . . . " option 2402 from within the menu 2400, where the username will appear as the desired recipient. The recipient then is presented with a dialog box asking if he or she would like to have the sender's contact user identity datatable 102 added to his or her own contact user identity datatable 102. Should the recipient accept the datatable transfer, the contact management program 100 on the first computing system 22a transfers the contact user identity datatable 102 of the sender to the second computing system 22b. The contact management program 100 operating on the second computing system 22b then integrates the contact user identity datatable 102 of the sender with the contact user identity datatable 102 of the recipient.

Alternative embodiments addressing the sharing of the contact user identity datatable 102 are possible. For example, a subset of the contact user identity datatable 102 could be transferred. Further, the recipient does not have to be one of the contacts listed in the contact user list 146, but instead could be selected from another list, such as a corporate directory or an electronic mail address book.

In another embodiment of the present invention, multiple contact user identity datatables 102a-102n may be maintained by the contact management program 100. For example, a user might set up a group of contacts to monitor while in a first location, such as Chicago, and a different group of contacts to monitor while in a second location, such as Singapore. The first group would be stored in the contact user identity datatable 102a and the second group would be stored in the contact user identity datatable 102b. Within the contact manager interface 140, an option would be provided to toggle between the two datatables. Similarly, the user could organize contacts based upon particular projects, where different contact user identity datatables, such as 102a and 102b, could be used, with contact management program 100 providing an option to switch between the datatables.

The contact management program 100 may automatically remove names from the contact user identity datatable 102 if they had not been used within a certain period of time in order to keep the chat contact manager 130 current. In a preferred embodiment, the contact management program 100 is configured to remove contacts with whom the user has not had contact with via electronic mail or telephone for a period of time. The contact management program 100 provides the user with an opportunity to select the period of time. The contact user identity datatable 102 is updated accordingly to remove those contacts.

Figure 17:
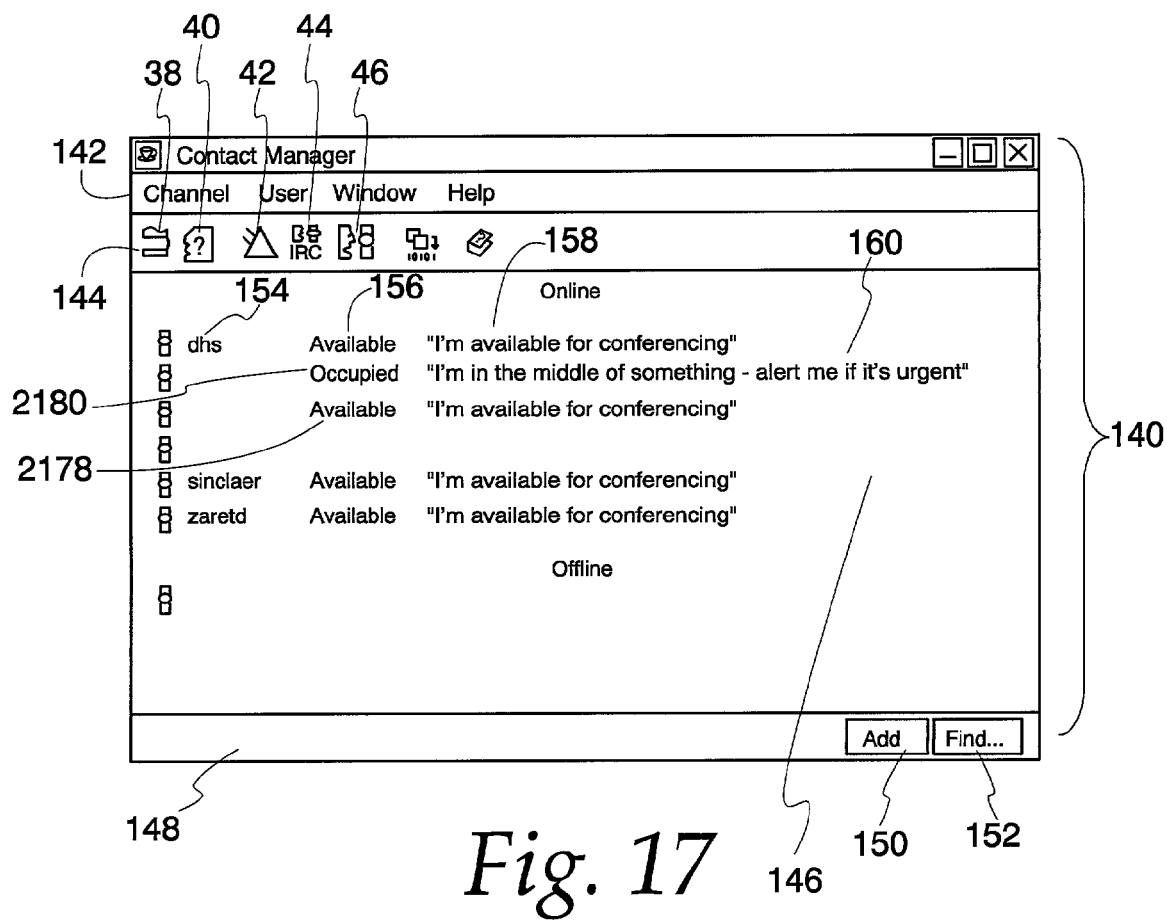
FIG. 17 depicts a contact manager interface in which the status messages of users are shown.
Figure 18:
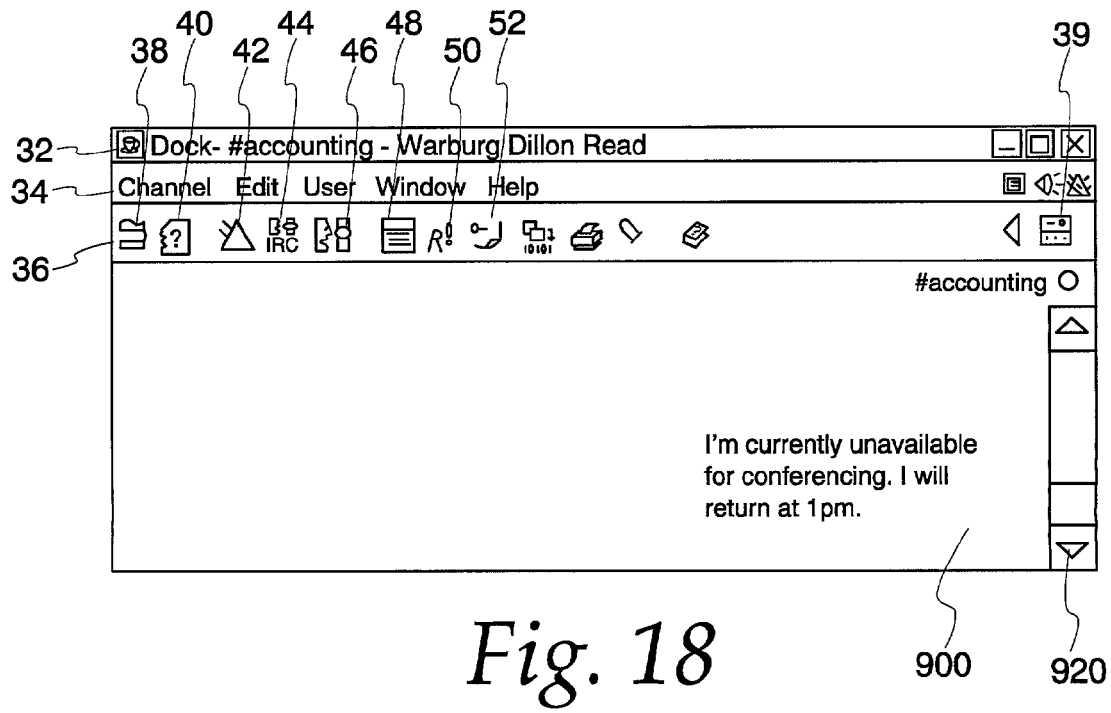
FIG. 18 depicts a user interface from which a user can set his or her user status availability message and custom user status availability message.

Referring to FIG. 17, the contact user identity list 146 contains various pieces of information about a user including the contact name 154, the user availability status message 156, and the custom user availability status message 158. An example contact user identity list 146 is depicted in FIG. 17. In this example, there are five users online and none offline. Of the five online, four are available for conferencing, and one is occupied. The availability messages 156 and 158 are usually set by the contact management program 100 as defaults. These defaults could include "Available" 2178, "Occupied" 2180 or "Away" (not shown). An "Available" status 2178 indicates that the system user is ready for conferencing. An "Occupied" status 2180 indicates that the user is at his or her terminal, but that they are not actively watching their computing system 22. An "Away" status indicates that the user is not at his or her computing system 22 and, consequently, not available for conferencing. Each of these default messages may be enhanced with a customized availability message 2184 that gives other system users a more detailed account of why someone is not available or a more detailed account of how long that person thinks he will be unavailable. Referring to FIG. 18, to set the custom user availability status message 158, the user selects arrow 920. A text box is then opened, in which the system user inputs the desired custom availability status message 158.

Figure 19:
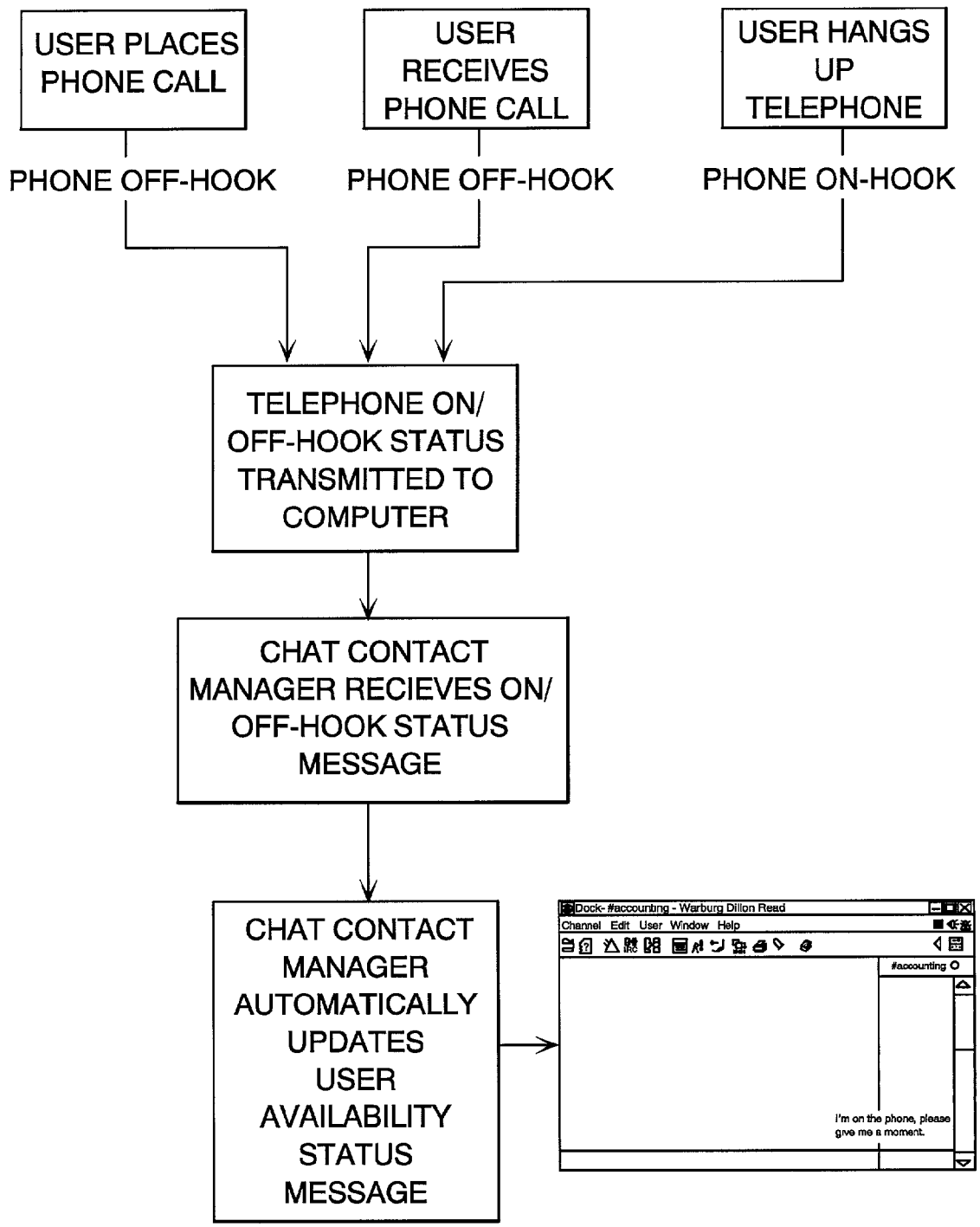
FIG. 19 is a flow diagram relating to the integration of telephony and the user interface program.

User availability status messages 156 can also be generated automatically as well by various applications interacting with the contact management program 10, such as telephone systems and calendaring programs. To establish this interaction, the contact management program 100 is integrated with a user's telephone unit. Referring to FIG. 19, when the user places a phone call or receives a phone call, the phone is considered "off hook." The phone status ("on hook" or "off hook") is transmitted to the contact management program 100 of a computing system 22. The contact management program 100 updates the user status message datatable 106 to indicate that the user is currently "occupied" (i.e,. the user is on the telephone). Upon terminating the telephone call, the telephone on/off hook status changes to on hook, and the contact management program 100 is notified of the phone's new status. The contact management program 100, in response, updates the user status message datatable 106 to reset the status of the user to its value prior to the telephone call, unless indicated otherwise.

Referring to FIGS. 20A-B, user availability status messages 156 may also be generated by utility/application programs 50 (FIG. 2B), which in this example is a calendar application. Examples of utility and application programs 50 are Microsoft Outlook™ or Netscape Communicator™. An integration program integrates the contact management program 100 with calendar application program 50. The user, in this example, creates a calendar entry by filling in the data fields. The user enters standard information into the calendar application user interface, such as "Subject," "Location," "Start Time," "End Time," and reminder information. In the integrated calendar interface, the user may also enter chat availability information, such as whether the chat availability feature should be activated 222, the availability status message to be generated 224 and availability status message customization 226. The information entered by the user is stored in utility/application datatable 54 (FIG. 2A).

To determine a user's availability for updating the availability status message, the contact management program 100 periodically checks the utility/application datatable 54 (e.g., the calendar application datatable in this example). The contact management program 100 searches the utility application datatable 54 for upcoming appointments or events. The user may determine the frequency with which the contact management program 100 searches the utility/application datatable 54. Based on that frequency, the contact management program 100 searches the utility application datatable 54 to determine if an event is to occur during that time period. If an event is set to occur during that time period, the contact management program 100 refers to the user's preferences in the utility/application datatable 54. If the user indicated that his or her user availability status 156 should change when the event occurs, then the contact management program 100 will adjust the status of the user in the user status message datatable 106 accordingly. Similarly, when the contact management program 100 determines that an event has ended, the contact management program 100 will return the user's status message to its default message or another message identified in the user status message datatable 106.

Figure 21:
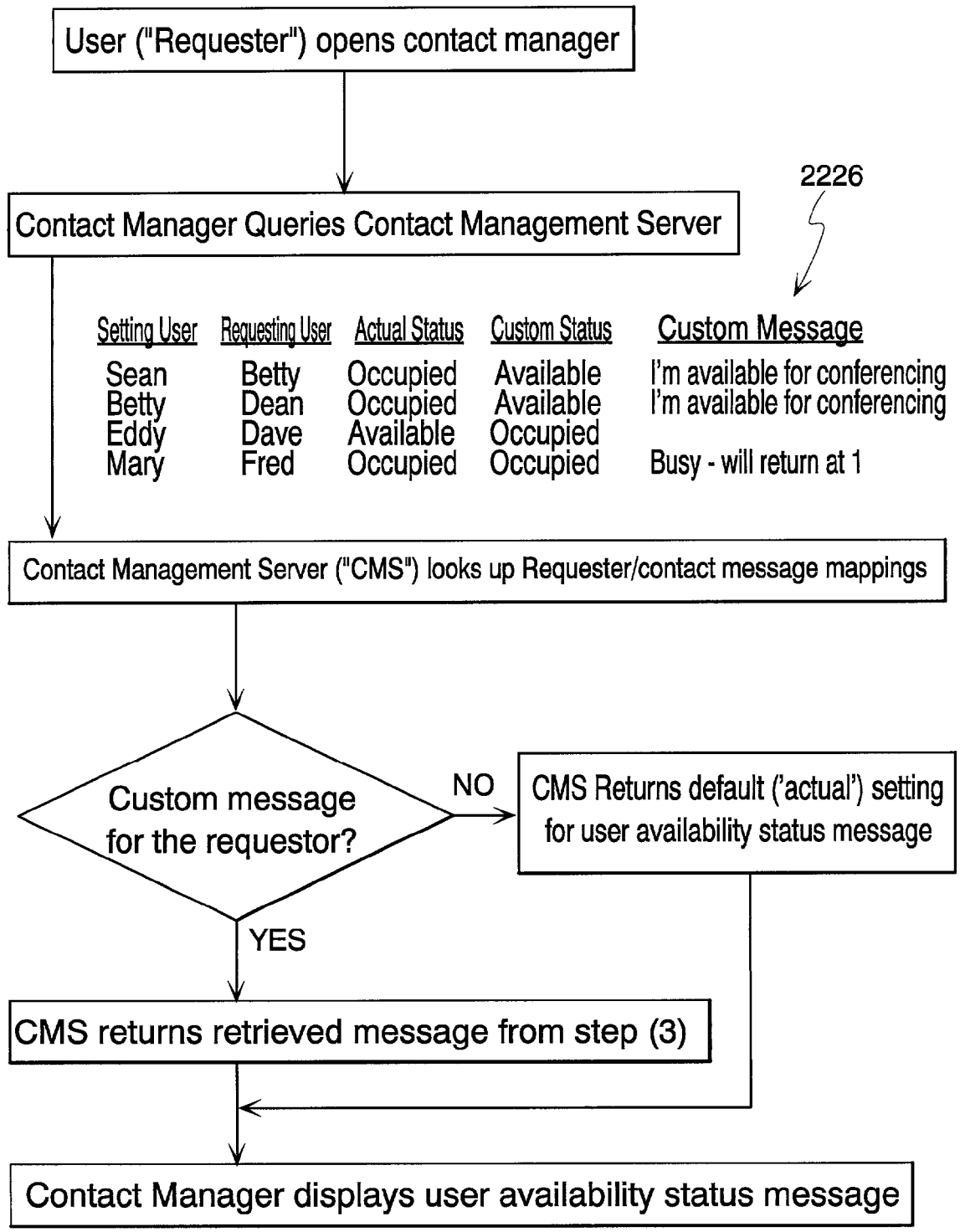
FIG. 21 is a flow diagram relating to the manner in which user status messages are determined and transmitted.
Figure 22:
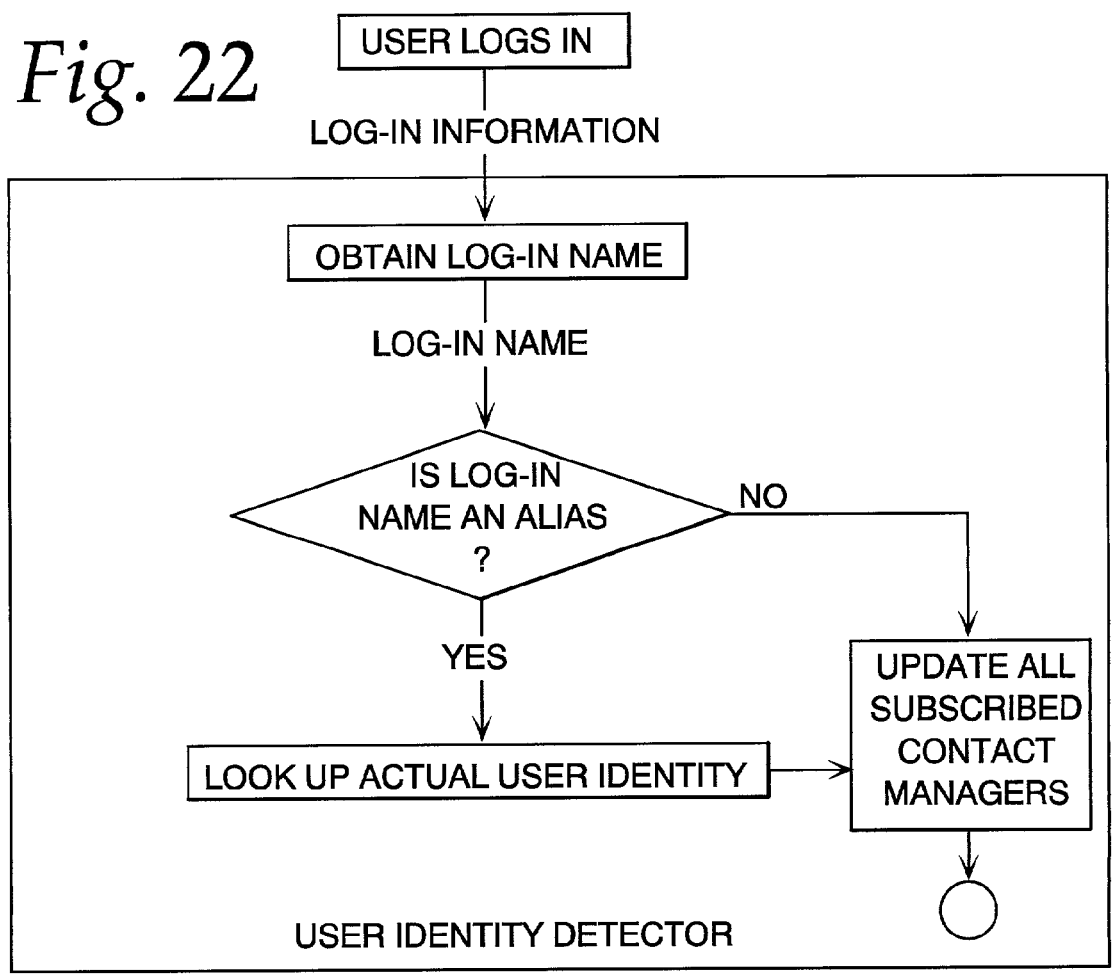
FIG. 22 is a flow diagram relating to how the system management program identifies a users identity.

A user may also set a variety of differing availability status messages that are customized to respond to other particular system users. For example, a user could specify that he or she is "Occupied" and "In a meeting until 3:00PM" for everyone except for his or her boss. His or her boss, on the other hand, would receive a message such as "Available for Urgent Messages About the Deadline." Tailoring availability messages to the person inquiring is accomplished by maintaining a mapping of potential contacts to potential "requesters" for the contact manager 130. Referring to FIG. 21, a system user can map these tailored availability messages by loading customized messages for each individual potential requester. A sample tailored status message mapping is shown at 2226. When a requestor requests the status of the person who loaded the customized messages, the system management program 28 determines the identity of the requester. The system management program 28 knows the requestors identity because the system management program 28 identified the requester when he or she logged into the system as illustrated in FIG. 22. The system management program 28 uses this requestor identity information to determine if a particular availability status message has been entered for that requester. If a tailored message has been loaded for that requester, the system management program 28 transmits that tailored message back to the requester. If a tailored message has not been loaded for that requester, then the actual availability status of the user inquired about is transmitted back.

Figure 23:
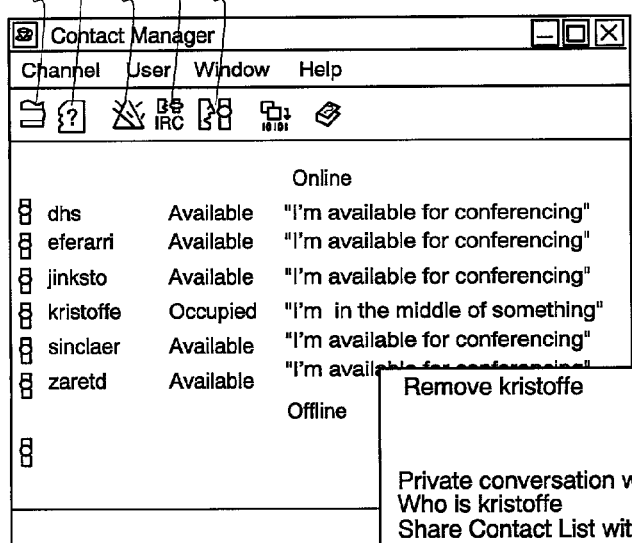
FIG. 23 depicts a contact manager interface in which the user is able to determine the channels to which a selected user is subscribed, and from which the user can join those channels.

Referring to FIG. 23 a contact manager interface 140 similar to one depicted in FIG. 17 is shown. A system user can find out information about the users in his contact manager interface 140 by right-clicking on the entries in the contact manager interface 140. As illustrated in FIG. 23, right-clicking on "kristoffe" generates a menu and from this menu the inquiring system user can find out all of the channels "kristoffe" has joined. The inquiring user may click on a channel listed in this menu to join that channel.

Figure 24A:
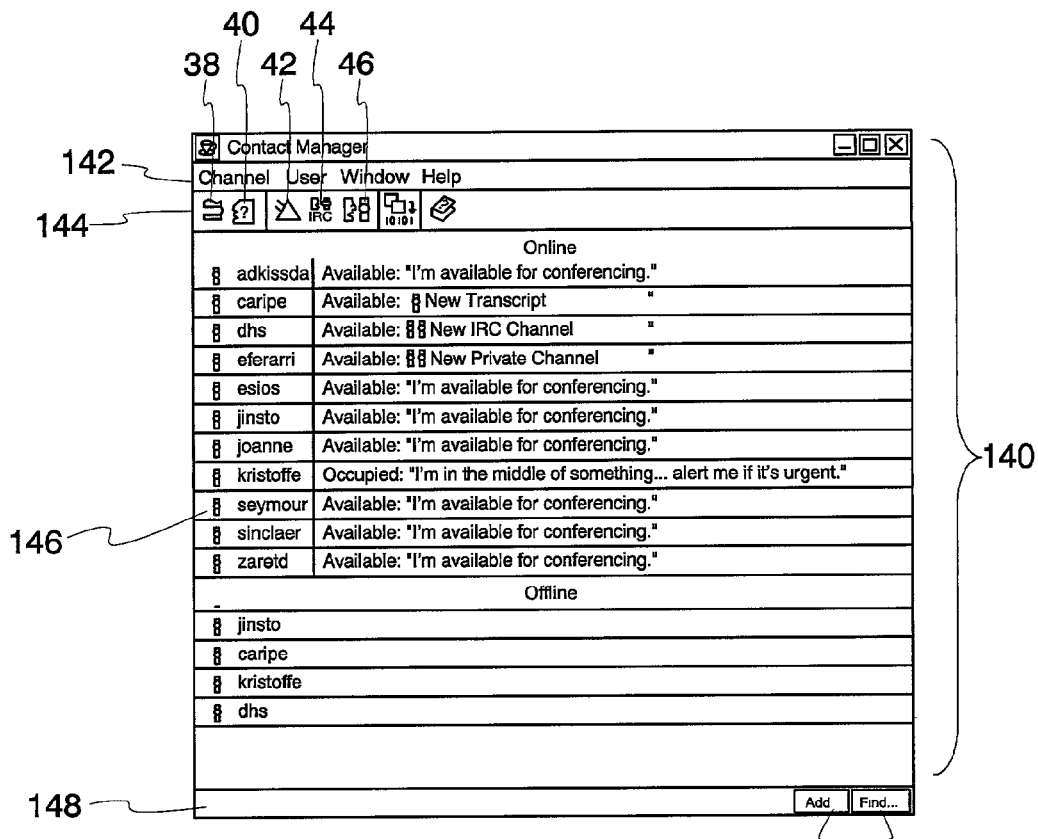
FIG. 24A depicts a contact manager interface in which a user can select to generate a transcript for a selected user.
Figure 24B:
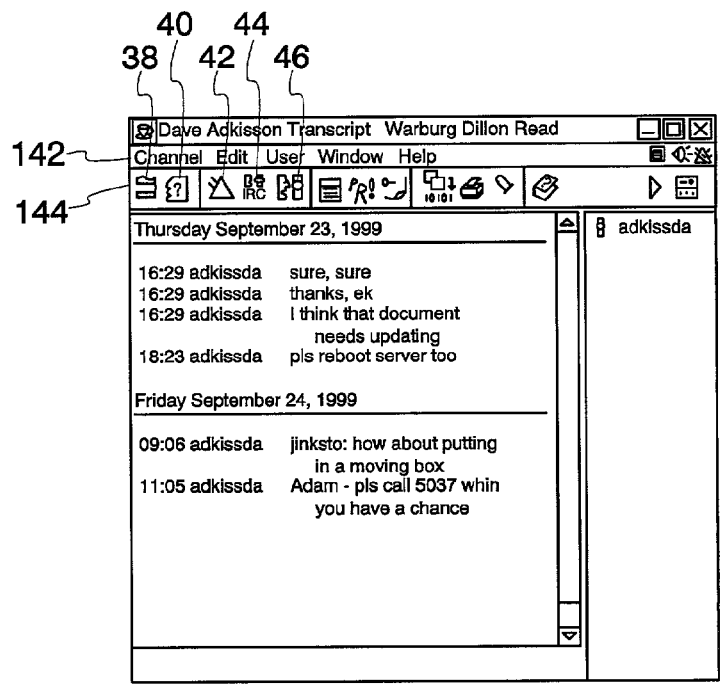
FIG. 24B depicts the transcript generated as a result of making a selection in the contact manager interface to generate a transcript for a selected user.

Referring to FIGS. 24A-B, a system user can make a transcript of a messages from other system users. The system user does this from the contact manager interface 140 by right-clicking on the name of the user he or she wants to make a transcript of. A menu is then generated with the option of creating a "New Transcript". Selecting the "New Transcript" option will start a transcript of all of the messages from that user to the user who generated the transcript. In the example depicted in FIGS. 24A-B, the user who wants the transcript has selected to make a transcript of every message from the user "adkissda". FIG. 24B shows the transcript created by this request.

Figure 25:
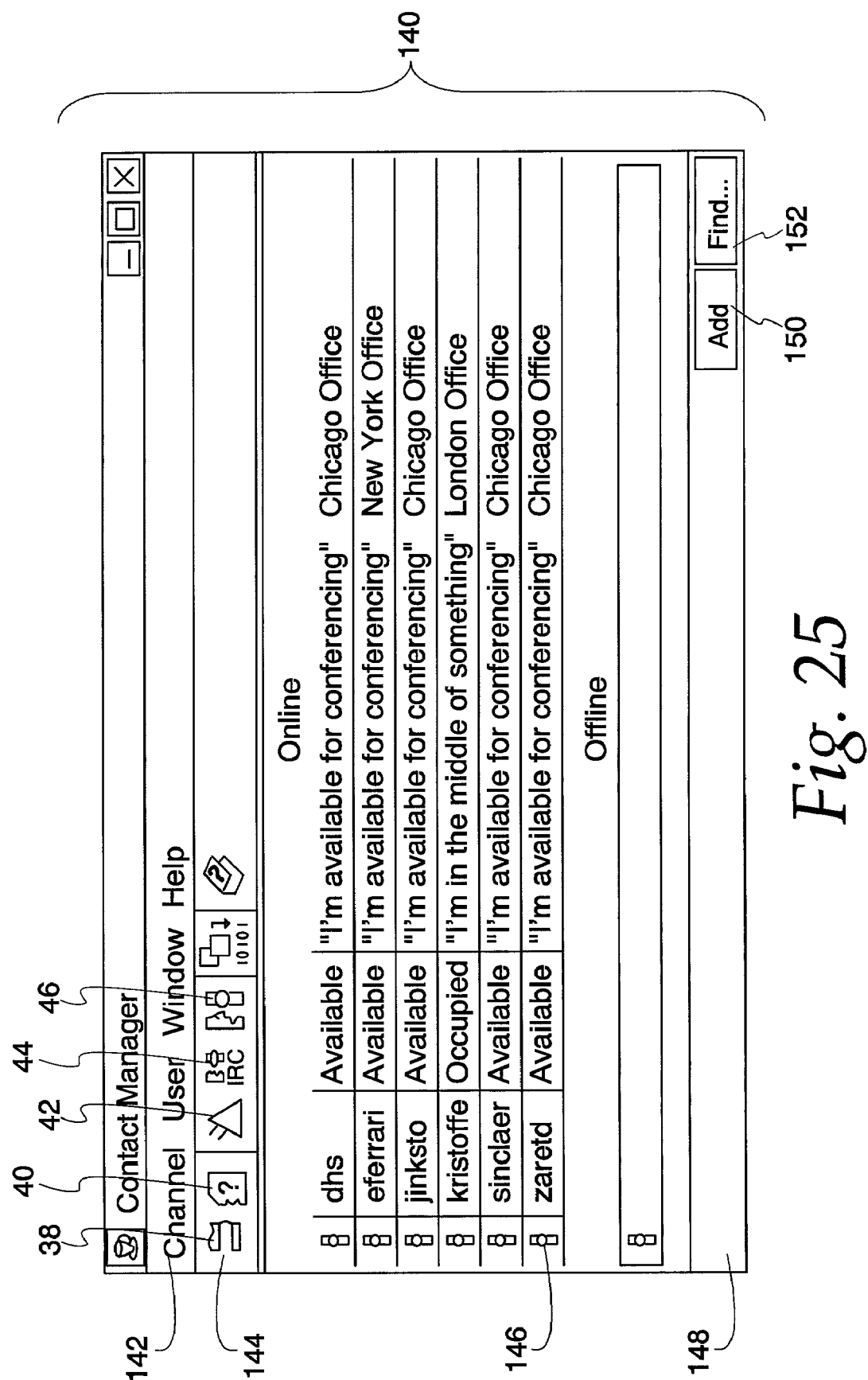
FIG. 25 depicts a contact manager interface in which a user's status message, custom status message and location are shown.

As depicted in FIG. 25, the system can provide information concerning the location of an end user. The contact manager interface 140 depicted in FIG. 25 contains an additional column of information which contains information concerning the location of the users in the contact user identity datatable 102. For example, the user location datatable 108 (FIG. 2A) can contain information concerning the Internet Protocol (IP) address of the computing system 22. Such information can be stored in the user location datatable 108. Information concerning the physical location of the subnet to which each particular IP address belongs could be stored in the user location datatable 108, and would contain information concerning the location of each IP address. When a user connects to the system 10, and specifically the system management program 28, the IP address field is transferred to system management program 28 and is stored in the connected user datatable 320. When a user opens the contact management program 100, the contact management program 100 queries the system management program 28 regarding the status of users in the contact user identity datatable 102. The system management program 28 references the connected user datatable 320. The system management program 28 provides the contact management program 100 with information in response to the query. Included in the information provided to the contact management program 100 is the IP address of each of the contacts listed in the contact user list 146. The contact management program 100 then references the user location datatable 108 to determine the location of each contact. The contact management program 100 is then able to display information, (i.e. online, offline, and user availability status, and location), concerning the users listed in the contact user identity datatable 102. Other methods could include referencing a corporate human resources directory stored in PeopleSoft or LDAP, or referencing a corporate travel datatable.

Alternatively, the physical location of the user could be entered through the contact manager interface 140. Such information would be stored in the user location datatable 108. When a user opens the contact management program, the contact management program 100 queries the system management program 28 regarding the status of users in the contact user identity datatable 102. The system management program 28 references the connected user datatable 320. The system management program 28 provides the contact management program 100 with information in response to the query. Included in the information provided to the contact management program 100 is the user entered location of each of the contacts listed in the user datatable 324. The contact management program 100 is then able to display information, (i.e., online, offline, and user availability status, and location), concerning the users listed in the contact user identity datatable 102.

Will Call

The will call feature allows an end user to leave responses, electronic files, software or other "deliverable" elements for other end users on the system 10. What is left at will call is referred to as a package. Examples of a package include a text message, a word processing document, a uniform resource locator (URL) to a web site, a streaming video feed, an executable code, or any other type of information that a user could access through the information management component 26. The will call feature is accessed through the contact manager interface 140.

Figure 26A:
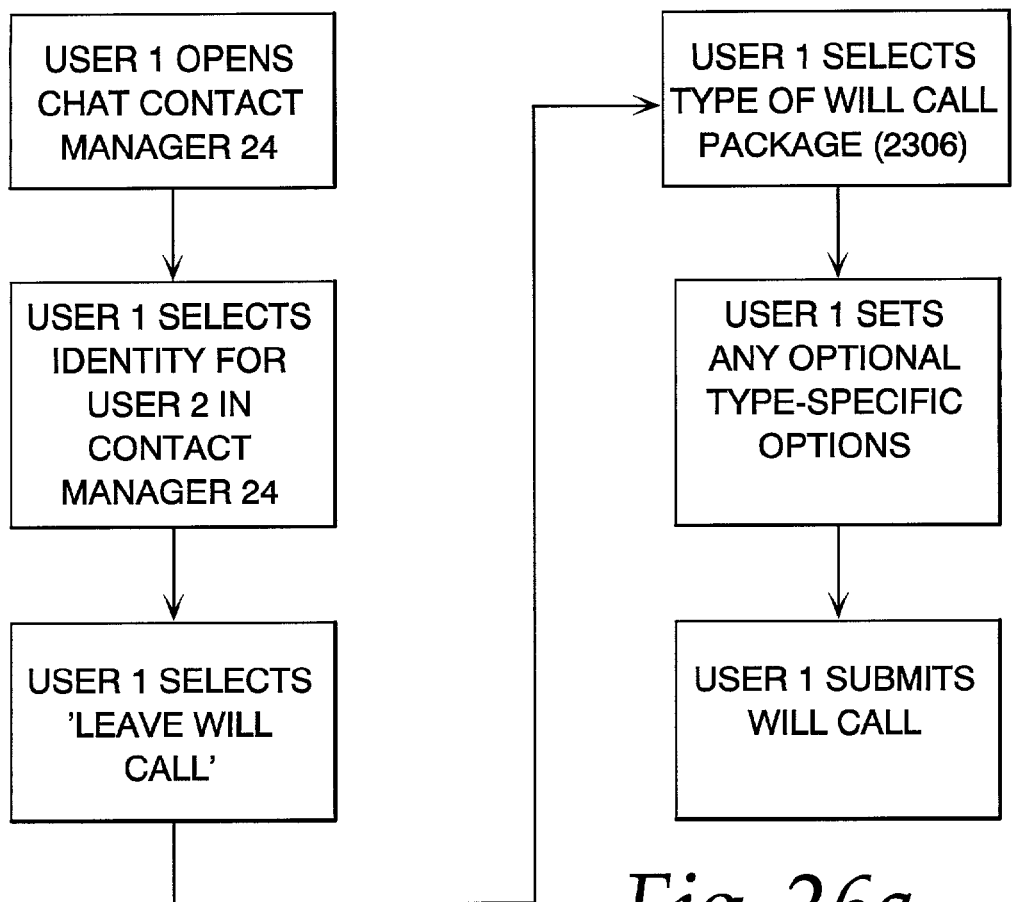
FIG. 26A is a flow diagram for a manner in which a user leaves a will call package.

Referring to FIG. 26A, a flow diagram of the will call feature of the preferred embodiment of the present invention is shown. A user opens the contact management program 100. The user selects the username for a recipient from within the contact manager interface 140. The user makes a selection that will leave a will call package for the recipient. The user then makes a selection regarding the type of package that is to be left at will call. Then the user sets any optional type-specific options, based upon the file type that is being left at will call. Finally, the user submits the will call package for the recipient.

In the preferred embodiment of the present invention, the will call package is delivered when the recipient connects to the system management program 28. In this embodiment, the recipient receives the will call package immediately, rather than at such time as the recipient attempts to establish a channel of communication with the sending user. Upon confirmation that the will call package is to be received by the recipient, the will call package is transferred from the first computing system 22a through the use of the system end user component 26 via the system 10 to the second computing system 22b through the system end user component 26. Having had the will call package delivered to the second computing system 22b, the recipient can choose to open the package with applications resident on the second computing system 22b.

Figure 26B:
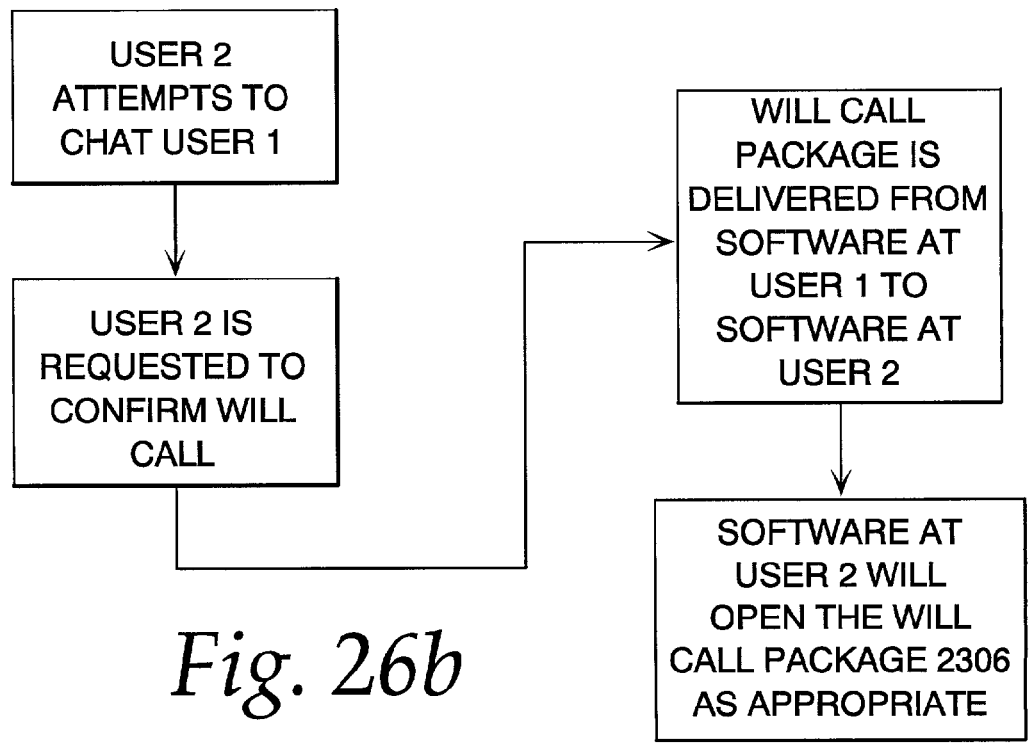
FIG. 26B is a flow diagram for a manner in which a user retrieves a will call package.

Referring to FIG. 26B, a flow diagram depicting the steps associated with an alternative embodiment for retrieving a will call package are shown. When the recipient attempts to chat with the sending user, the recipient is requested to confirm the receipt of the will call package. Upon confirmation that the will call package is to be received by the recipient, the will call package is transferred from the first computing system 22a through the use of the system end user component 26 via the system 10 to the second computing system 22b through the system end user component 26. Having had the will call package delivered to the second computing system 22b, the recipient can choose to open the package with applications resident on the second computing system 22b.

Such a will call system is useful for situations where alternative delivery mechanisms are unreliable. An example could relate to a situation where multiple persons are working on a document, and the first person needs to send the document to the second person immediately upon login.

Figure 27:
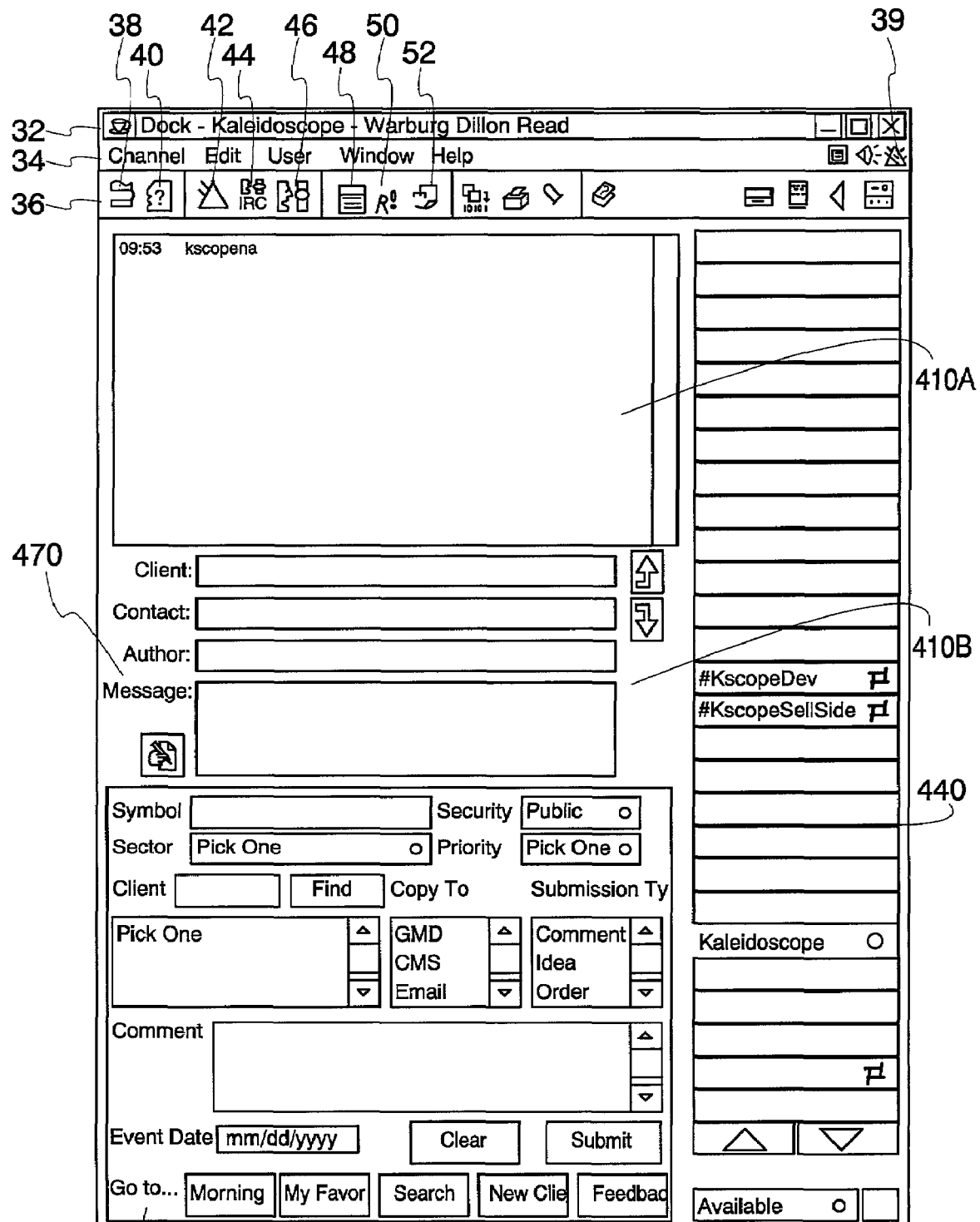
FIG. 27 depicts a user interface window in which a structured input panel and a parameterized data mask are present.

In the preferred embodiment of the system of the present invention, incoming messages displayed in the chat content area 410 may be displayed as discrete parameterized data. Referring to FIG. 27, the chat content area 410a contains an unformatted text message, while chat content area 410b contains parameterized data in a parameterized data mask 470. Note that while the example depicted in FIG. 27 includes a chat content area 410a which contains an unformatted text message, a chat content area 410a is not required. In one embodiment of the present invention, formatted data is transmitted via the system 10 from the system management program 28 to the user interface program 200. The user interface program 200 modifies the formatted data as necessary and places it in a format that can be displayed in a parameterized data mask 470. The formatted data is then displayed in an embedded application within channel window 206, and specifically in the chat content area 410b, and more specifically in the parameterized data mask 470. In another embodiment of the present invention, data that is not formatted parameterized data is transmitted via the system 10 to the user interface program 200. The user interface program 200 then analyzes the loosely formatted data using business heuristics. The user interface program 200 uses the business heuristics to extract the parameterized data parameters from the transmitted non-formatted parameterized data. The user interface program 200 modifies the non-formatted parameterized data as necessary and places it in a format that can be displayed in a parameterized data mask 470. The non-formatted parameterized data is then displayed in an embedded application within channel window 206, and specifically in the chat content area 410b, and more specifically in the parameterized data mask 470.

A parameterized data mask 470 is useful in the context of making information available to the transcript datatable 365. The utility/application program 50 is able to export information from the parameterized data mask 470 to the transcript datatable 365 such that it can later be retrieved based on fields within the data array (which is composed of the elements of the data mask).

Figure 28:
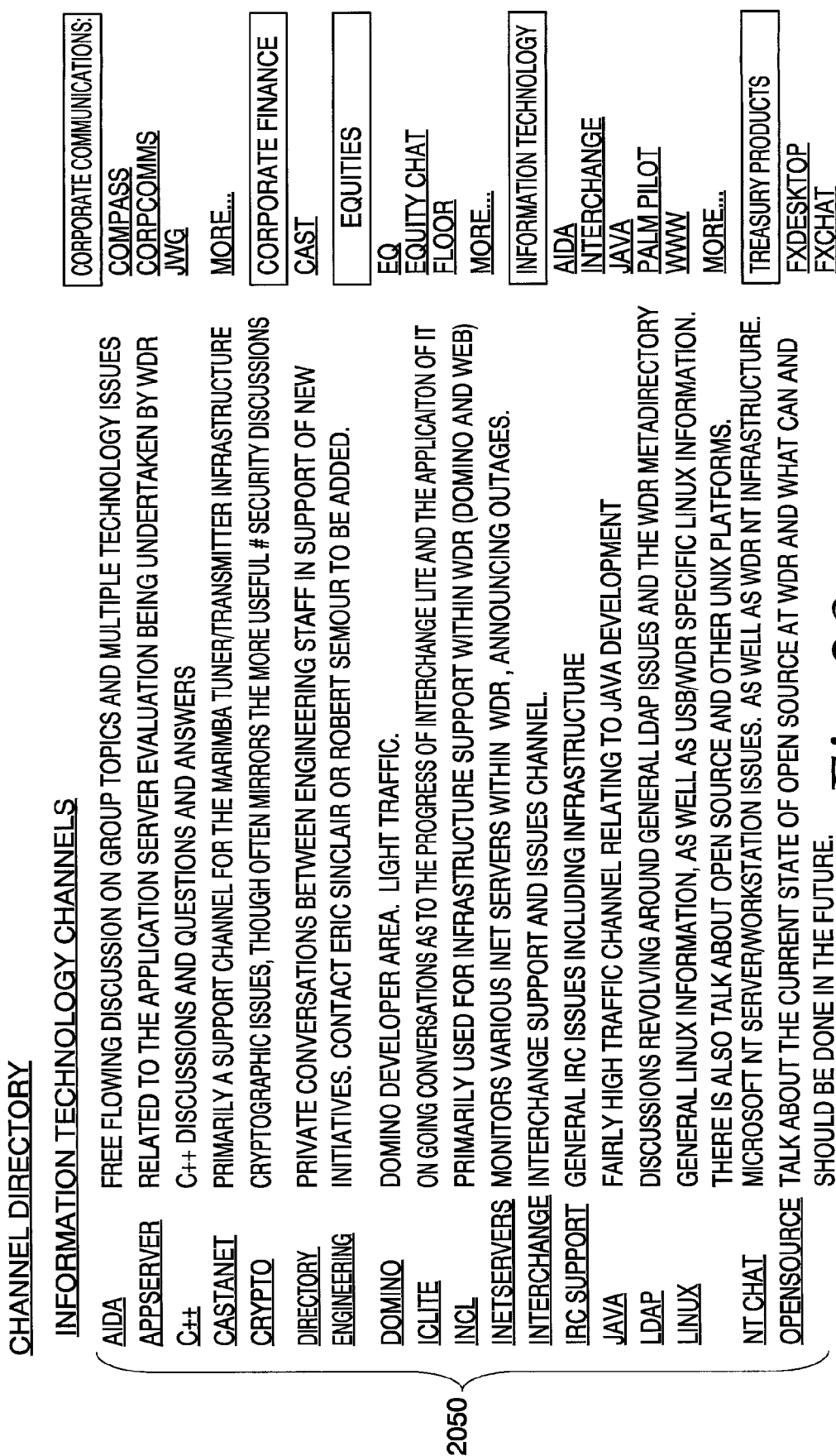
FIG. 28 depicts a user interface in which a channel directory is shown.

Referring to FIG. 28, in the preferred embodiment of the present invention, a categorized channel user interface 2050 may be generated in which an organized listing of the forum channels is displayed. The user may request from the user interface 30 the organized listing. In response, the user interface program 200 requests from the system management program 28 an organizational scheme relating to the forum channels contained in the forum channel datatable 302. The organization scheme is stored in the forum channel datatable 302. The system management program 28 provides to the user interface program 200 the organizational scheme via the categorized channel user interface 2050. The user then selects the category of interest. In response to the selection, the system management program 28 retrieves from the forum channel data set 302 all of the channels meeting the selection. The channels are then displayed to the user in the categorized channel user interface 2120. The user may then select and join any of the channels from the chosen category.

The categorization of the forum channels may be done manually or automatically. The channels may be manually categorized by users, while the channels may be automatically categorized based upon the content received on the channels. The system management program 28 could monitor the channels and determine the proper categorization of the channels and update the organizational scheme contained in the forum channel data set 302. The categorized channel interface is preferably a lightweight, platform independent user interface for the control of the system management program 28. One way to implement the categorized channel user interface 2050 is through the use of common gateway interface (CGI) scripts, a simple HTML interface, and Java servlets.

The system management program 28 provides the ability to log forum channels for contextual and historical chat messages, the ability to provide a persistent forum channel, i.e. one that does not disappear across server starts or user connections and disconnections, and the ability to control the displayed topic of a forum channel.

Administration of these functions is carried out by platform independent screens delivered via HTTP to computer systems 22. Access to maintain these functions is controlled via standard authentication techniques (such as HTTP/1.0) and the system management program 28 by administratively defined channel managers, each of which uses authentication to connect to the system management program 28.

The security feature of the system management program 28 allows access to restricted channels. The system management program 28 monitors restricted channels. When a user joins, the system management program 28 requests the user's identity from user identity data set 34. The user interface program 200 provides the user's identity to the system management program 28 which then references the user datatable 324 to determine whether the user is authorized to be on the channel. If the user is authorized, the user is allowed to participate on the channel. If the user is not authorized, the system management program 28 removes the user from the channel, if the channel was so set up.

Referring to FIG. 29, access to channels is determined through an interface generated by the system management component. When a user who is an authorized channel manager wishes to manage channels, the user makes a selection which generates the channel management interface 2120. From within the channel management interface 2120, the user is able to select a list of users who will have access to, i.e. permission to join, a particular managed forum channel. The permissions are stored by the system management program 28 in the user datatable 324. Management of channels is further monitored by the system management program 28 pursuant to additional criteria entered by the channel manager. Referring to FIG. 30, the channel manager is able to make selections with regards to whether the channel should be logged 2102 by the system management program 28, whether people who are not in the authorized user list should be kicked out of the channel 2104, and whether the channel is by invitation only 2106. Such criteria is stored in the channel datatable 300 for reference by the system management program 28. One means of implementing the entered criteria is through the use of "bots" on IRC-based channels. The channel management interface 2120 is preferably a lightweight, platform independent user interface for the control of the system management program 28. One way to implement the channel management interface 2120 is through the use of common gateway interface (CGI) scripts and a simple HTML interface.

Figure 31:
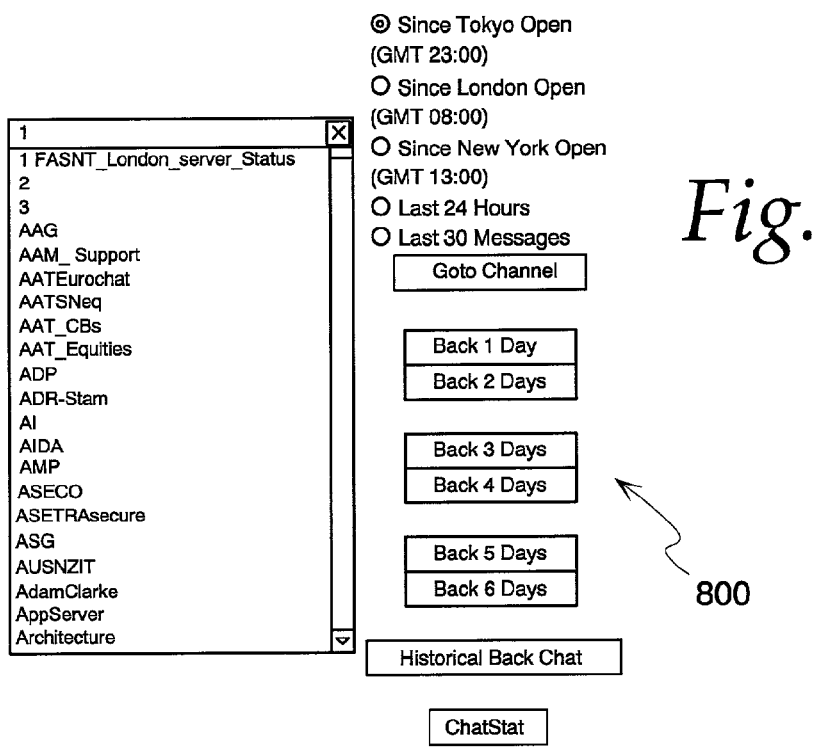
FIG. 31 depicts a user interface in which a user can select the transcripts for particular channels from particular timeframes he or she wishes to review.
Figure 32:
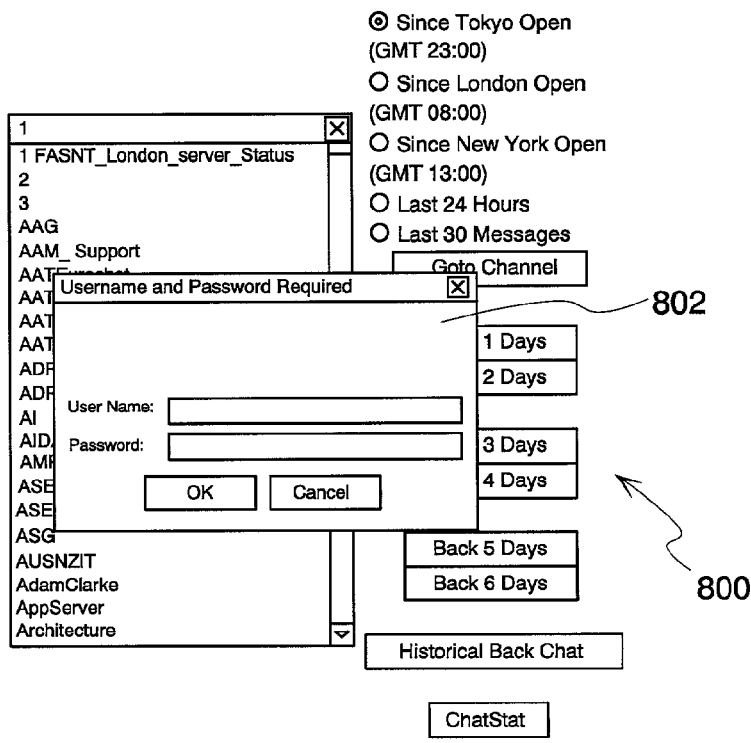
FIG. 32 depicts a dialog box in which a user must enter his or her username and password in order to gain access to the transcripts.
Figure 34:
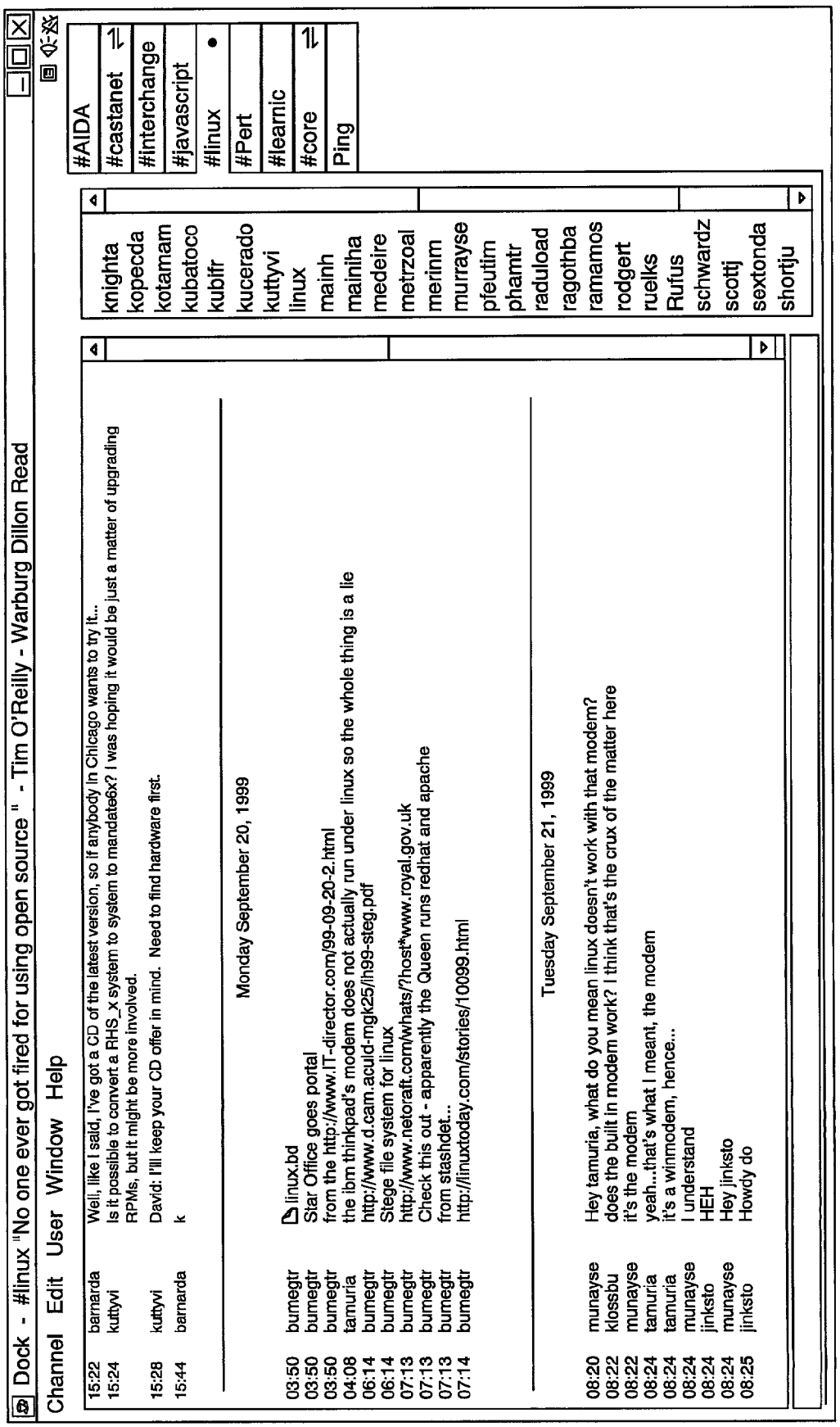
FIG. 34 depicts a user interface window in which messages from previous days are displayed.

The system management program 28 provides access to the transcript datatable 365. Referring to FIG. 31, through the user interface program 200, the user is able to generate a transcript interface 800 from which the user is able to view logged channel messages. Referring to FIG. 32, the system management program 28 preferably requires authentication by the user prior to accessing the transcript datatable 365. The system management program 28 generates an interface 802 in which a user enters a username and a password. The system management program 28 authenticates the user by accessing information stored within the user datatable 324. If the user is authenticated, the user is allowed access to the transcripts through an interface. From within the interface, the user is able to determine how many days' messages should be displayed. The system management program 28 retrieves from the transcript datatable 365 and displays the proper messages in the interface based upon the selection made by the user as illustrated in FIG. 33. In the preferred embodiment of the present invention, the user can display up to one week's worth of messages, as illustrated in FIG. 34. Further, the user can select to display messages from even further back in time.

Figure 35:
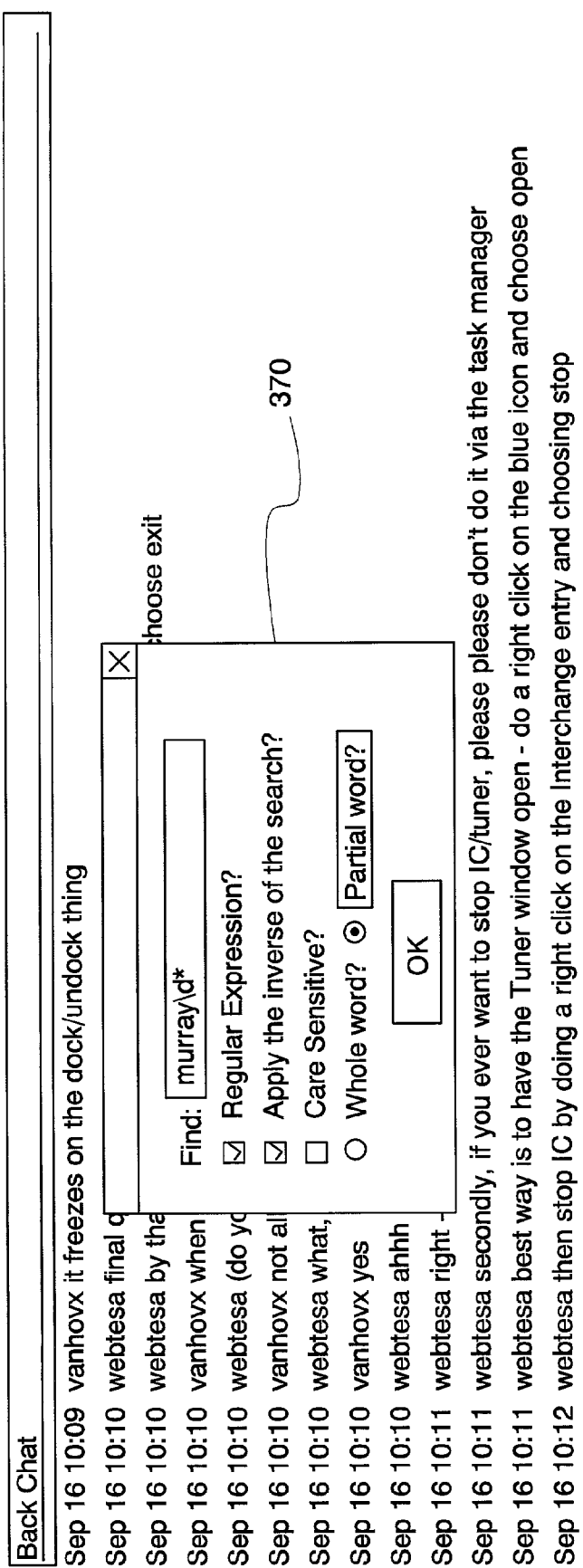
FIG. 35 depicts a dialog box in which a user can enter a query to be applied to the transcript datatable.

Preferably, the user may search the contents of the transcript datatable 365 through an interface generated by the system management program 28. Referring to FIG. 35, when the user wishes to search the contents of the transcript datatable 365, the user makes a selection and, in response to that selection, the user interface program 200 generates a search user interface 370. The user enters within the search user interface 370 certain search criteria, such as a username or content. The system management program 28 then searches the transcript datatable 365 for matching entries.

Figures 36, 37:
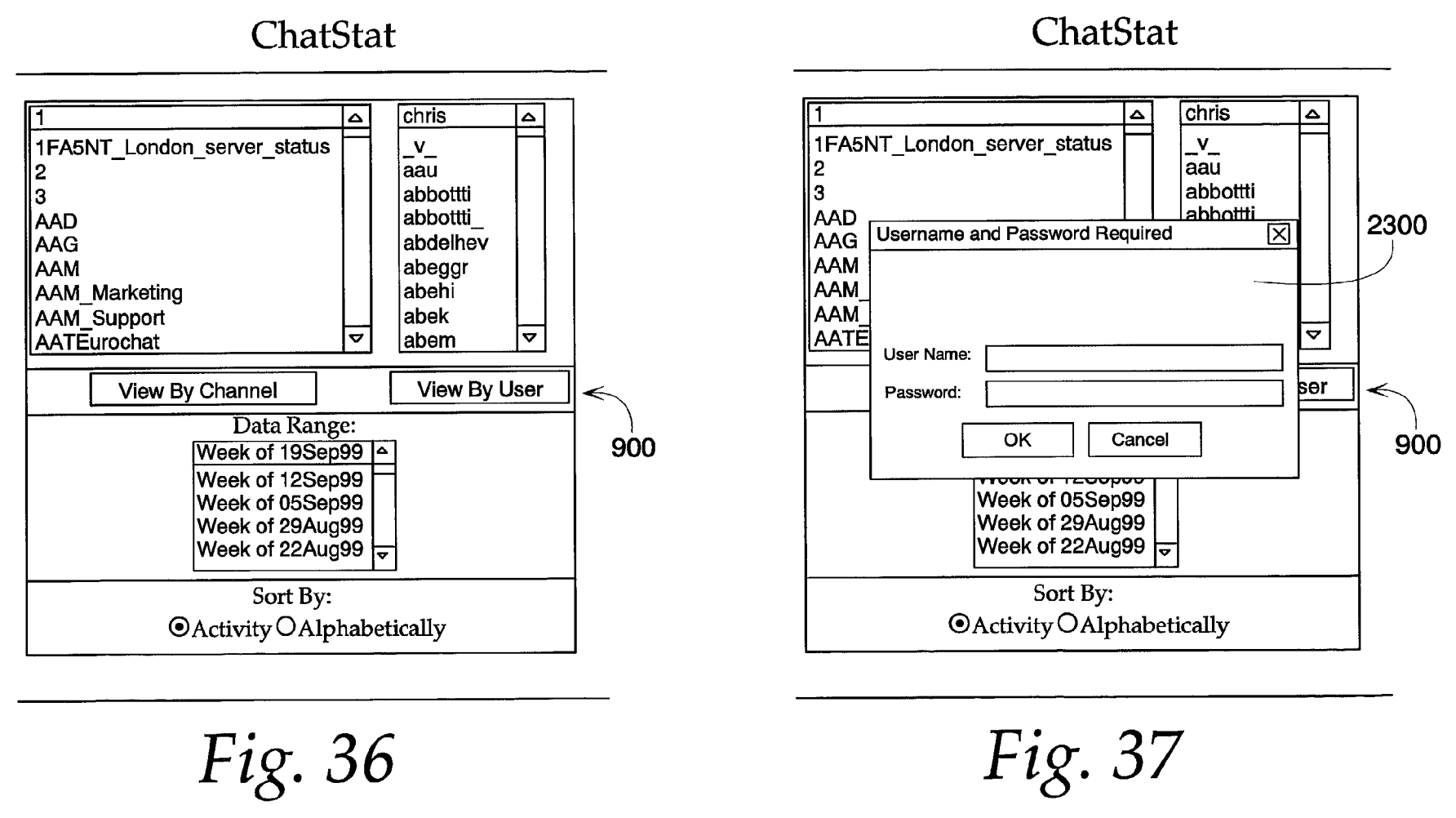

The system management program 28 provides access to a statistics datatable. This function provides for a method from which the type and frequency of contribution can be analyzed. Referring to FIG. 36, through the user interface program 200, the user is able to generate a statistics interface 900 from which the user is able to view statistics relating to users and/or channels. Preferably, the system management program 28 requires authentication by the user prior to accessing the statistics datatable, or particular channel information contained within the statistics datatable. Referring to FIG. 37, the system management program 28 generates an interface 2300 in which a user enters a username and a password. The system management program 28 authenticates the user by accessing information stored within the user datatable 324. If the user is authenticated, the user is allowed access to the statistics through an interface. From within the interface, the user is able to view statistics on a per channel or per user basis. Further, the user is able to select to view the statistics for a given channel for a given week. The system management program 28 retrieves from the statistics datatable and displays the proper information in the interface based upon the selection made by the user.

Access to the statistics interface can be controlled by any of various authentication mechanisms, such as HTTP/1.0, utilized by the system management program 28. Controlling the access to the statistics interface precludes unauthorized users from viewing statistics on channels, limits them to a particular group of channels, or otherwise limits or grants access to the type of information that is available to the user.

A further feature of the system end user component 26 is the ability to create special application "plug-ins," or application interaction windows. An application interaction window provides a way to integrate and embed applications within a system end user component 26, and vice versa. This inter-application communication can occur using network calls, such as remote procedure calls (RPC's) or HTTP calls, together with some form of platform interoperability architecture, such as CORBA, and a data formatting scheme, such as Extensible Markup Language (XML). The processing instructions for processing the data may be written in any suitable scripting language that can be interpreted by the user interface program (e.g., Java, JavaScript or Python).

In the preferred embodiment of the present invention, the user interface program 200 maintains a token which is used to represent the current user. Preferably, the information contained in the token is derived from information from the operating system of the computing system 22. For example, in the case of Microsoft Windows NT, if the system end user component 26 was installed on Windows NT, the system end user component 26 would automatically use the user's current Windows NT login. This information is acquired by the system end user component 26 as a result of making system calls to the operating system on which it is running. The making of system calls to an operating system is a practice that is well known to those skilled in the art.

Figure 38:
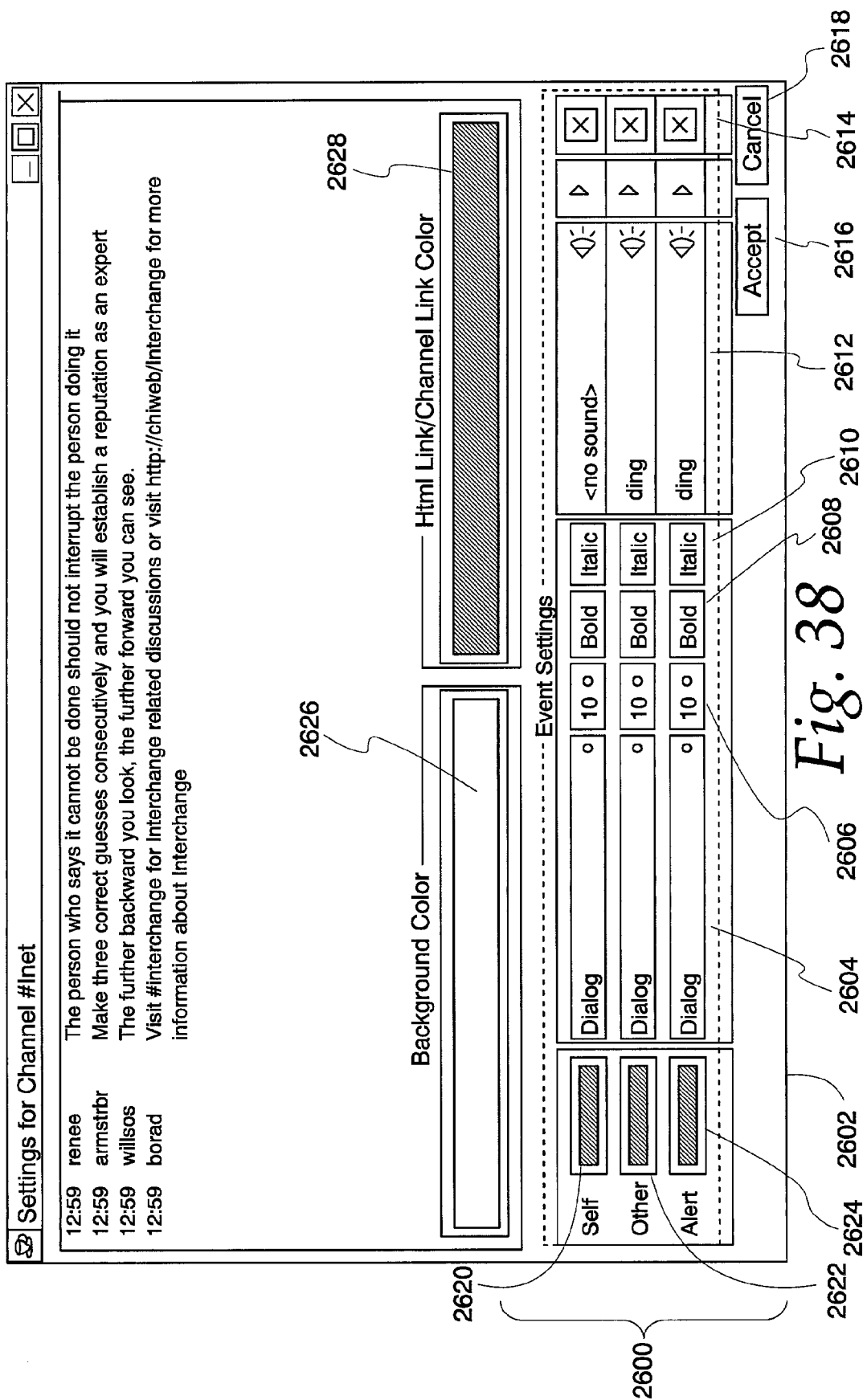
FIG. 38 depicts a user interface window in which a user can select channel preferences.

Preference data concerning the manner in which information and messages received in the chat content area 410 are displayed, as well as the manner in which a user is notified of incoming information and messages, is stored in the user datatable 324. Referring to FIG. 38, the user is able to select from the user interface program 200 a preference interface 2600 which is preferably generated on a per channel basis. In the preferred embodiment of the present invention, the user is able to adjust the text color, font, font size, font in bold, font in italics, sound, and window floating, based upon whether the user 2620 or someone other than the user 2622 is sending the message, as well as for alerts 2624. Further, the user can preferably adjust the background color as well as the color of hyperlinks/channel links. The user adjusts the text color through a color chooser 2602 which allows for the user to select the text color of messages. The user adjusts the font setting through a font chooser 2604 which allows for the user to select the font of the messages. Further, the user can choose the font size using a font size chooser 2606, as well as select whether to have the text stylized, e.g. bold 2608 and/or italics 2610. The user selects via a checkbox 2614 whether to have the window float from the user interface 30 when content meeting the criteria is satisfied. The user may adjust the sound played when content meeting the criteria is received using a sound chooser 2612. The user adjusts the background color through a color chooser 2626. The user adjusts the color of hyperlinks/channel links through a color chooser 2628. When the user selects to accept the changes, via the "accept" button 2616, the user interface program 200 transmits the preferences to the system management program 28 which stores the preferences in the user datatable 324. The user preference data is stored on the system management computing system 20 to support travelling users. Preferably, the user preference information is additionally stored on the computing system 22 in the local user datatable 240. The user interface program 200 may be configured to retrieve the user preference information from either the user datatable 324 or the local user datatable 240.

In the preferred embodiment, the user can modify the visual and/or audio notification for channels. The modifications are done from either the user interface 30 or a channel window 206.

The settings for the customizable visual focus are "float," "do not float," or "float on alert." If content arrives on a channel and the setting is "float" regardless of the content type, the channel window 206 will float from the user interface 30. The purpose of floating is to draw the user's attention. If content arrives on a channel and the setting is "do not float" regardless of the content type, the channel window 206 will not float from the user interface 30. If "alert" content arrives on a channel and the setting is "float on alert," the channel window 206 will float from the user interface 30 and draws the user's attention.

The settings for the customizable audio alert are "play sound," "do not play sound," and "play sound on alert." If content arrives on a channel and the setting is "play sound," the system end user component 26 will play a sound. If content arrives on a channel and the setting is "do not play sound," the system end user component 26 will not play a sound. If "alert" content arrives on a channel and the setting is "play sound on alert," the system end user component 26 will play a sound.

While the invention has been discussed in terms of preferred and specific embodiments, it should be appreciated by those of skill in the art that the invention is not so limited. The embodiments are explained herein by way of example, and there are numerous modifications, variations and other embodiments that may be employed that would still be within the scope of the present invention.

What is claimed is:

1. A system for structuring content within a message and transmitting the structured message over a computer network in a real time chat environment, the system comprising:
   a system administration computing system comprising:
      a system management program operative to provide a real time chat interface for enabling a plurality of users to communicate with one another in a plurality of different real time chat channels over the computer network, and
      a channel manager configured to allow an end user to manage the plurality of real time chat channels, wherein the channel manager configured to allow the end user to manage the plurality of real time chat channels comprises the channel manager being configured to allow the end user to:
         review the plurality of real time chat channels,
         create additional real time chat channels, and
         create a filtered channel, wherein the filtered channel comprises an aggregation of selected real time chat channels, the selected real time chat channels being selected by the end user according to at least one of the following:
            content associated with the plurality of real time chat channels,
            at least one user name associated with the plurality of real time chat channels, and
            previously stored criteria comprising at least one of the following: a specified content and at least one specified user name, wherein the previously stored criteria is used to monitor the plurality of real time chat channels and provide information associated with the stored criteria; and
   a second computing system having a network interface program for communicating with the real time chat interface, wherein the network interface program accepts message content comprising text and other content entered by one of the plurality of users, establishes the real time chat interface with the system management program, interacts with the system management program to structure the content within the message, and transmits the structured message over at least one of the channels of the computer network, wherein the system management program structures the message content in a specific format based on fields associated with the message content.

2. The message content structuring and transmission system of claim 1, wherein the second computing system is an end user computing system and the network interface program is an end user interface program.

3. The message content structuring and transmission system of claim 2, wherein the end user interface program, based on configuration instructions, generates a structured message content input panel having message content fields for the end user to enter message content into.

4. The message content structuring and transmission system of claim 3, wherein: after message content to be structured is entered into the structure input panel message content fields, the end user interface program structures the message content for transmission over the computer network.

5. The message content structuring and transmission system of claim 4, wherein data specific to the end user creating the message is associated with the structured message content for message creation identification purposes.

6. The message content structuring and transmission system of claim 3, wherein the message content fields are generated dynamically based on the configuration instructions and data specific to the end user.

7. The message content structuring and transmission system of claim 6, wherein the specific end user data used to dynamically generate the message content fields is an end user identification code.

8. The message content structuring and transmission system of claim 6, wherein the specific end user data used to dynamically generate the message content fields is an end user location identifier.

9. The message content structuring and transmission system of claim 6, wherein the specific end user data used to dynamically generate the message content fields is an identifier for the end user computing system.

10. The message content structuring and transmission system of claim 2, wherein the end user interface program, upon receipt of a structured message, generates a structured message output panel to display the structured message content.

11. The message content structuring and transmission system of claim 1, wherein the at least one real time chat channel is a forum channel.

12. The message content structuring and transmission system of claim 1, wherein the at least one real time chat channel is a private channel.

13. The message content structuring and transmission system of claim 1, wherein the filtered channel is used to post a message to multiple channels.

14. The message content structuring and transmission system of claim 1, wherein the end user interface program allows at least one of the plurality of real time chat channels to be docked to the user interface.

15. The message content structuring and transmission system of claim 1, wherein the end user interface program allows at least one of the plurality of real time chat channels to be undocked from the user interface.

16. The message content structuring and transmission system of claim 1, wherein the end user interface program generates at least one user interface message alert for at least one of the real time chat channels.

17. The message content structuring and transmission of claim 16, wherein the at least one interface message alert is visual.

18. The message content structuring and transmission of claim 16, wherein the at least one interface message alert is audio.

19. The message content structuring and transmission system of claim 1, wherein at least one of the real time chat channels includes at least one contextual chat message.

20. The message content structuring and transmission system of claim 1, wherein the system management program converts synchronous message content to asynchronous message content for storage.

21. The message content structuring and transmission system of claim 1, further comprising a third computing system having a network interface program with a real time chat interface for communicating over the computer network.

22. The message content structuring and transmission system of claim 21, wherein the second computing system transmits structured messages directly to the third computing system.

23. The message content structuring and transmission system of claim 1, wherein the second computing system is an application computing system having an application program and the network interface program is a network application management program.

24. The message content structuring and transmission system of claim 23, wherein the structured message sent to the network by the application program is a notification message.

25. A system for structuring content within a message and transmitting the structured message over a computer network in a real time chat environment, the system comprising:
first means operative to provide a real time chat interface for enabling a plurality of users to communicate with one another in a plurality of different real time chat channels over the computer network;
second means for communicating with the real time chat interface, wherein the second means for communicating with the real time chat interface accepts message content comprising text and other content entered by one of the plurality of users, establishes the real time chat interface with the first means for communicating, interacts with the first means to structure the content within the message, and transmits the structured message over at least one of the channels of the computer network, wherein the second means structures the message content in a specific format based on fields associated with the message content; and
third means having a channel manager configured to allow at least one of the plurality of users to manage the plurality of different real time chat channels, wherein the channel manager configured to allow the at least one of the plurality of users to manage the plurality of different real time chat channels comprises the channel manager being configured to allow the at least one of the plurality of users to:
review the plurality of real time chat channels,
create additional real time chat channels, and
create a filtered channel, wherein the filtered channel comprises an aggregation of selected real time chat channels, the selected real time chat channels being selected by the end user according to at least one of the following:
content associated with the plurality of real time chat channels,
at least one user name associated with the plurality of real time chat channels, and
previously stored criteria comprising at least one of the following: a specified content and at least one specified user name, wherein the previously stored criteria is used to monitor the plurality of real time chat channels and provide information associated with the stored criteria.

26. The message content structuring and transmission system of claim 25, wherein the second means, based on configuration instructions, generates a structured message content input panel having message content fields for the end user to enter message content into.

27. The message content structuring and transmission system of claim 26, wherein the message content fields are generated dynamically based on the configuration instructions and data specific to the end user.

28. The message content structuring and transmission system of claim 27, wherein the specific end user data used to dynamically generate the message content fields is an end user identification code.

29. The message content structuring and transmission system of claim 27, wherein the specific end user data used to dynamically generate the message content fields is an end user location identifier.

30. The message content structuring and transmission system of claim 27, wherein the specific end user data used to dynamically generate the message content fields is an identifier for the end user computer system.

31. The message content structuring and transmission system of claim 26, wherein: after message content to be structured is entered into the structured input panel message content fields, the second means structures the message content for transmission over the computer network.

32. The message content structuring and transmission system of claim 31, wherein data specific to the end user creating the message is associated with the structured message content for message creation identification purposes.

33. The message content structuring and transmission system of claim 25, wherein at least one of the real time chat channels is a forum channel.

34. The message content structuring and transmission system of claim 25, wherein at least one of the real time chat channels is a private channel.

35. The message content structuring and transmission system of claim 25, wherein the filtered channel is used to post a message to multiple channels.

36. The message content structuring and transmission system of claim 25, wherein the second means allows at least one of the real time chat channel to be docked to the user interface.

37. The message content structuring and transmission system of claim 25, wherein the second means allows at least one of real time chat channel to be undocked to the user interface.

38. The message content structuring and transmission system of claim 25, wherein the second means generates at least one user interface message alert of a real time chat channel.

39. The message content structuring and transmission system of claim 38, wherein the at least one interface message alert is visual.

40. The message content structuring and transmission system of claim 38, wherein the at least one interface message alert is audio.

41. The message content structuring and transmission system of claim 25, wherein at least one of the real time chat channel includes at least one contextual chat message.

42. The message content structuring and transmission system of claim 25, wherein the first means converts synchronous message content to asynchronous message content for storage.

43. The message content structuring and transmission system of claim 25, wherein the second means, upon receipt of a structured message, generates a structured message output panel to display the structured message content.

44. The message content structuring and transmission system of claim 25, further comprising a third means having a real time chat interface for communicating over the computer network.

45. The message content structuring and transmission system of claim 44, wherein the second means transmits structured messages directly to the third means.

46. The method for structuring message content and transmitting the structured message content over a computer network in a real time chat environment, the method comprising:
providing a system administration computing system having a system management program with a real time chat interface for enabling a plurality of users to communicate with one another in a plurality of different real time chat channels over the computer network;
providing a channel manager configured to allow at least one of the plurality of users to manage the plurality of different real time chat channels, wherein the channel manager configured to allow the at least one plurality of end users to manage the plurality of different real time chat channels comprises the channel manager being configured to allow the at least one of the plurality of end users to:
review the plurality of real time chat channels,
create additional real time chat channels, and
create a filtered channel, wherein the filtered channel comprises an aggregation of selected real time chat channels, the selected real time chat channels being selected by the end user according to at least one of the following:
content associated with the plurality of real time chat channels,
at least one user name associated with the plurality of real time chat channels, and
previously stored criteria comprising at least one of the following: a specified content and at least one specified user name, wherein the previously stored criteria is used to monitor the plurality of real time chat channels and provide information associated with the stored criteria;
providing the message content to the computer network, wherein the message content comprises text and other content entered by one of the plurality of users;
structuring the message content within a message in a specific format based on fields associated with the message content;
establishing the real time chat interface with the system administration computing system; and
transmitting the structured message to the system management program.

47. The message content structuring and transmission method of claim 46, further comprising generating a structured message content input panel having message content fields for acceptance of message content.

48. The message content structuring and transmission method of claim 46, further comprising generating a user interface, wherein the at least one real time chat channel includes at least one contextual chat message.

49. The message content structuring and transmission method of claim 48, further comprising docking the at least one real time chat channel to the user interface.

50. The message content structuring and transmission method of claim 48, further comprising undocking the at least one real time chat channel to the user interface.

51. The message content structuring and transmission method of claim 48, further comprising generating at least one user interface message alert for at least one real time chat channel.

52. The message content structuring and transmission method of claim 46, further comprising converting synchronous message content to asynchronous message content for storage.

53. The message content structuring and transmission method of claim 46, further comprising generating a structured message output panel to display received structured message content.

54. The method for structuring message content and transmitting the structured message content over a computer network in a real time chat environment, the method comprising:
providing a system administration computing system having a system management program with a real time chat interface for enabling a plurality of users to communicate with one another in a plurality of different real time chat channels over the computer network;
providing the message content to the computer network, wherein the message content comprises text and other content entered by one of the plurality of users;

providing a channel manager configured to allow at least one of the plurality of users to manage the plurality of different real time chat channels, wherein the channel manager configured to allow the at least one plurality of end users to manage the plurality of different real time chat channels comprises the channel manager being configured to allow the at least one of the plurality of end users to:
  review the plurality of real time chat channels,
  create additional real time chat channels, and
  create a filtered channel, wherein the filtered channel comprises an aggregation of selected real time chat channels, the selected real time chat channels being selected by the end user according to at least one of the following:
    content associated with the plurality of real time chat channels,
    at least one user name associated with the plurality of real time chat channels, and
    previously stored criteria comprising at least one of the following: a specified content and at least one specified user name, wherein the previously stored criteria is used to monitor the plurality of real time chat channels and provide information associated with the stored criteria;
establishing a real time chat interface with the system administration computing system; and
transmitting the message content to the system management program using at least one of the real time chat channels, wherein the system management program structures the message content in a specific format based on fields associated with the message content.

55. A computer-readable medium having computer-executable instructions for structuring message content for transmission over a computer network in a real time chat environment, the method executed by the instructions comprising:
  establishing a real time chat interface with the computer network over at least one of a plurality of real time chat channels;
  establishing a channel manager configured to allow an end user to manage a plurality of real time chat channels, wherein the channel manager configured to allow the end user to manage the plurality of real time chat channels comprises the channel manager being configured to allow the end user to:
    review the plurality of real time chat channels,
    create additional real time chat channels, and
    create a filtered channel, wherein the filtered channel comprises an aggregation of selected real time chat channels and is operative to transmit the message content to the aggregated real time chat channels, the selected real time chat channels being selected by the end user according to at least one of the following:
      content associated with the plurality of real time chat channels,
      at least one user name associated with the plurality of real time chat channels, and
      previously stored criteria comprising at least one of the following: a specified content and at least one specified user name, wherein the previously stored criteria is used to monitor the plurality of real time chat channels and provide information associated with the stored criteria;
  generating a structured message content input panel having message content fields for acceptance of message content comprising text and other content;
  receiving the message content from within the computer network;
  structuring the message content in a specific format based on message content fields associated with the message content; and
  transmitting the structured message content over at least one of the plurality of real time chat channels in the computer network.

56. The method executed by the computer-executable instructions of claim 55, further comprising generating a user interface, wherein the at least one real time chat channel includes at least one contextual chat message.

57. The method executed by the computer-executable instructions of claim 56, further comprising docking the real time chat channel to the user interface.

58. The method executed by the computer-executable instructions of claim 56, further comprising undocking the real time chat channel to the user interface.

59. The method executed by the computer-executable instructions of claim 56, further comprising generating at least one user interface message alert for a real time chat channel.

60. The method executed by the computer-executable instructions of claim 55, further comprising converting synchronous message content to asynchronous message content for storage.

61. The method executed by the computer-executable instructions of claim 55, further comprising generating a structured message output panel to display received structured message content.

* * * * *